US 8,495,520 B2
Jul. 23, 2013

(12) United States Patent
Islam et al.

(10) Patent No.: US 8,495,520 B2
(45) Date of Patent: Jul. 23, 2013

(54) REPRESENTING A PLURALITY OF INDEPENDENT DATA ITEMS

(75) Inventors: Farhad Fuad Islam, Apex, NC (US); Neil Eric Carlyle, Bayview (AU); Margaret Hanna, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 2417 days.

(21) Appl. No.: 10/350,038

(22) Filed: Jan. 24, 2003

(65) Prior Publication Data
US 2003/0169303 A1 Sep. 11, 2003

(30) Foreign Application Priority Data

Feb. 15, 2002 (AU) ........................................ PS0586

(51) Int. Cl.
*G06F 3/048* (2006.01)
*G06F 3/00* (2006.01)

(52) U.S. Cl.
USPC ........... 715/848; 715/764; 715/839; 715/859; 725/37; 725/39; 725/50

(58) Field of Classification Search
USPC ................. 715/763–767, 772, 800, 801, 815, 715/836, 837, 848–852, 859; 725/37, 39, 725/40, 43–47, 50, 56, 61
See application file for complete search history.

(56) References Cited

U.S. PATENT DOCUMENTS

| | | | | |
|---|---|---|---|---|
| 5,333,256 A | | 7/1994 | Green et al. ................... | 395/159 |
| 5,984,502 A | | 11/1999 | Calder .......................... | 364/188 |
| 6,002,401 A | * | 12/1999 | Baker .......................... | 715/839 |
| 6,160,551 A | | 12/2000 | Naughton et al. ............ | 345/339 |
| 6,377,276 B1 | * | 4/2002 | Ludtke ......................... | 345/620 |
| 6,388,665 B1 | * | 5/2002 | Linnett et al. ................ | 345/473 |
| 6,522,347 B1 | * | 2/2003 | Tsuji et al. .................... | 715/848 |
| 6,597,378 B1 | * | 7/2003 | Shiraishi et al. ............. | 715/764 |
| 6,621,508 B1 | * | 9/2003 | Shiraishi et al. ............. | 715/810 |
| 6,792,615 B1 | * | 9/2004 | Rowe et al. ................... | 715/722 |
| 2002/0040475 A1 | * | 4/2002 | Yap et al. ....................... | 725/39 |
| 2002/0112237 A1 | * | 8/2002 | Kelts ............................. | 725/39 |
| 2002/0144273 A1 | * | 10/2002 | Reto ............................. | 725/86 |
| 2002/0174430 A1 | * | 11/2002 | Ellis et al. ..................... | 725/46 |

FOREIGN PATENT DOCUMENTS

| | | |
|---|---|---|
| JP | 2001-1973893 | 7/2001 |
| JP | 2002-290864 | 10/2002 |
| WO | WO 97/02700 | 1/1997 |

\* cited by examiner

*Primary Examiner* — Haoshian Shih
(74) *Attorney, Agent, or Firm* — Fitzpatrick, Cella, Harper & Scinto

(57) ABSTRACT

The method represents a plurality of independent data items. The method first assigns a multi-dimensional iconic representation to each data item, then alters at least one dimension of each iconic representation according to a change in a corresponding state of the corresponding data item.

6 Claims, 20 Drawing Sheets

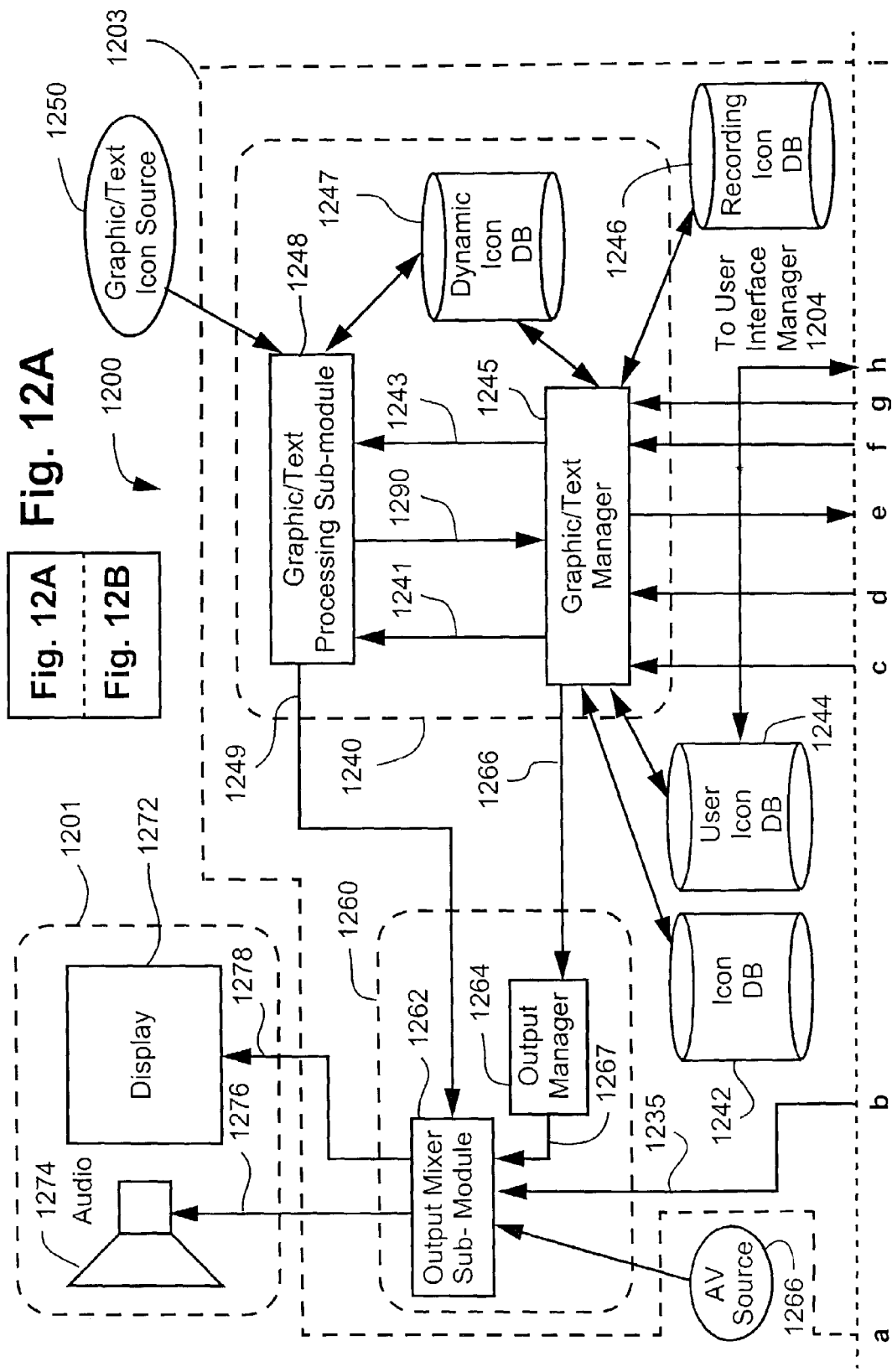

REPRESENTING A PLURALITY OF INDEPENDENT DATA ITEMS

TECHNICAL FIELD OF THE INVENTION

The present invention relates generally to display systems and, in particular, to representing a plurality of independent data items.

BACKGROUND

Graphical user interfaces have traditionally been used for interfacing personal computer systems. Most popular graphic user interfaces that are available, such as Apple Macintosh, and Microsoft Windows are based on the "desktop icon". In a desktop icon system, the display screen is treated as a virtual desktop. Graphical symbols placed on the virtual desktop are used to represent common objects found in an office environment, such as files, file folders, and printers. These graphical symbols are typically known as "icons".

User interfaces are now being proposed for use with television systems and other display systems, some examples of which are described below. The publication U.S. Pat. No. 6,057,890 discloses a tabular user interface for a television system, where a user can upon demand view an electronic program guide on the television monitor. The electronic program guide comprises descriptions of programs currently being aired, and descriptions of future broadcasts. The user can navigate through the channel timeslots by manipulating keys on the remote control. The user may perform different operations from the electronic program guide, such as selecting a program for viewing, or setting an event timer. The publication U.S. Pat. No. 6,167,188 also discloses a tabular user interface for a television system, where a user can upon demand view an electronic program guide on the television monitor. The displayed electronic program guide includes an array of irregular cells each designating a program and which vary in length corresponding to the different television program time lengths. The user via this electronic program guide can select a program for viewing or subsequent recording. This tabular user interface also includes an event timer in the form of a field for indicating the time of a next scheduled time recording. The aforementioned United States patents both suffer from the disadvantage that the event timer does not intuitively indicate to a user how long before a predetermined event will occur.

SUMMARY OF THE INVENTION

It is an object of the present invention to substantially overcome, or at least ameliorate, one or more disadvantages of existing arrangements.

According to one aspect of the invention, there is provided a method of representing a plurality of independent data items, the method comprising the steps of: assigning a multi-dimensional iconic representation to each said data item; and altering at least one dimension of each said iconic representation according to a change in a corresponding state of said corresponding data item.

According to another aspect of the invention, there is provided a method of continuously representing a plurality of independent electronic program guide data items, the method comprising the steps of: assigning a multi-dimensional iconic representation to each said electronic program guide data item; altering at least one dimension of each said iconic representation according to a change in a corresponding state of said each corresponding electronic program guide data item; and presenting said each multi-dimensional iconic representation to thereby depict said change in said corresponding state.

According to still another aspect of the invention, there is provided a method of representing information about a program, the method comprising the steps of: assigning an object image to the program; displaying the object image in the case that a control state of the program satisfies a predetermined condition; and altering at least one of a size, a position, a viewing angle and a motion of the object image displayed by said displaying step according to the control state of the program in order to inform a user of the control state of the program.

According to still another aspect of the invention, there is provided a method of representing information about a program, the method comprising the steps of: displaying a scenery image; selecting an object image matched with the scenery image; and assigning the object image to the program, wherein said displaying step further displays the object image over the scenery image when a control state of the program satisfies a predetermined condition and alters a display state of the object image displayed by said displaying step to inform a user of the control state of the program.

According to still another aspect of the invention, there is provided a method of representing results of performing an application, the method comprising the steps of: performing the application and outputting the results; assigning an object image to an item of results output by said performing step; displaying the object image; and altering at least one of a size, a position, and motion of the object displayed by said displaying step according to a time lapse to attract user's attention to the results.

According to still further aspect of the invention, there is provided a method of displaying information on a television screen relating to a television program, the apparatus comprising: displaying a scenery image on the television screen; selecting an animated object image matching the scenery image; assigning the object image to the television program; and displaying the animated object image over the scenery image on the television screen wherein the animated displayed state of the object image varies in accordance with the control state of the television program in order that a user may sense the control state of the television program.

According to still further aspect of the invention, there is provided apparatus for representing a plurality of independent data items, the apparatus comprising: a module for assigning a multi-dimensional iconic representation to each said data item; and a module for altering at least one dimension of each said iconic representation according to a change in a corresponding state of said corresponding data item.

According to still further aspect of the invention, there is provided apparatus for continuously representing a plurality of independent electronic program guide data items, the apparatus comprising: a module for assigning a multi-dimensional iconic representation to each said electronic program guide data item; a module for altering at least one dimension of each said iconic representation according to a change in a corresponding state of said each corresponding electronic program guide data item; and a module for presenting said each multi-dimensional iconic representation to thereby depict said change in said corresponding state.

According to still further aspect of the invention, there is provided apparatus for representing information about a program, the apparatus comprising: a module for assigning an object image to the program; a module for displaying the object image in the case that a control state of the program satisfies a predetermined condition; and a module for altering at least one of a size, a position, a viewing angle and a motion of the object image displayed by said displaying module according to the control state of the program in order to inform a user of the control state of the program.

According to still further aspect of the invention, there is provided apparatus for representing information about a program, the apparatus comprising: a module for displaying a scenery image; a module for selecting an object image matched with the scenery image; and a module for assigning the object image to the program, wherein said displaying module further displays the object image over the scenery image when a control state of the program satisfies a predetermined condition and alters a display state of the object image displayed by said displaying module to inform a user of the control state of the program.

According to still further aspect of the invention, there is provided apparatus for representing results of performing an application, the apparatus comprising: a module for performing the application and outputting the results; a module for assigning an object image to an item of results output by said performing step; a module for displaying the object image; and a module for altering at least one of a size, a position, and motion of the object displayed by said displaying module according to a time lapse to attract user's attention to the results.

According to still further aspect of the invention, there is provided apparatus for displaying information on a television screen relating to a television program, the apparatus comprising: a module for displaying a scenery image on the television screen; a module for selecting an animated object image matching the scenery image; a module for assigning the object image to the television program; and a module for displaying the animated object image over the scenery image on the television screen wherein the animated displayed state of the object image varies in accordance with the control state of the television program in order that a user may sense the control state of the television program.

According to still further aspect of the invention, there is provided a computer program for representing a plurality of independent data items, the computer program comprising: a code module for assigning a multi-dimensional iconic representation to each said data item; and a code module for altering at least one dimension of each said iconic representation according to a change in a corresponding state of said corresponding data item.

According to still further aspect of the invention, there is provided a computer program for continuously representing a plurality of independent electronic program guide data items, the computer program comprising: a code module for assigning a multi-dimensional iconic representation to each said electronic program guide data item; a code module for altering at least one dimension of each said iconic representation according to a change in a corresponding state of said each corresponding electronic program guide data item; and a code module for presenting said each multi-dimensional iconic representation to thereby depict said change in said corresponding state.

According to still further aspect of the invention, there is provided a computer program for representing information about a program, the computer program comprising: a code module for assigning an object image to the program; a code module for displaying the object image in the case that a control state of the program satisfies a predetermined condition; and a code module for altering at least one of a size, a position, a viewing angle and a motion of the object image displayed by said displaying module according to the control state of the program in order to inform a user of the control state of the program.

According to still further aspect of the invention, there is provided a computer program for representing information about a program, the computer program comprising: a code module for displaying a scenery image; a code module for selecting an object image matched with the scenery image; and a code module for assigning the object image to the program, wherein said displaying module further displays the object image over the scenery image when a control state of the program satisfies a predetermined condition and alters a display state of the object image displayed by said displaying module to inform a user of the control state of the program.

According to still further aspect of the invention, there is provided a computer program for representing results of performing an application, the computer program comprising: a code module for performing the application and outputting the results; a code module for assigning an object image to an item of results output by said performing step; a code module for displaying the object image; and a code module for altering at least one of a size, a position, and motion of the object displayed by said displaying module according to a time lapse to attract user's attention to the results.

According to still further aspect of the invention, there is provided a computer program for displaying information on a television screen relating to a television program, the computer program comprising: a code module for displaying a scenery image on the television screen; a code module for selecting an animated object image matching the scenery image; a code module for assigning the object image to the television program; and a code module for displaying the animated object image over the scenery image on the television screen wherein the animated displayed state of the object image varies in accordance with the control state of the television program in order that a user may sense the control state of the television program.

BRIEF DESCRIPTION OF THE DRAWINGS

At least one embodiment of the present invention will now be described with reference to the drawings, in which:

FIGS. 12A and 12B show a schematic representation of the preferred television system;

DETAILED DESCRIPTION INCLUDING BEST MODE

Figure 1:
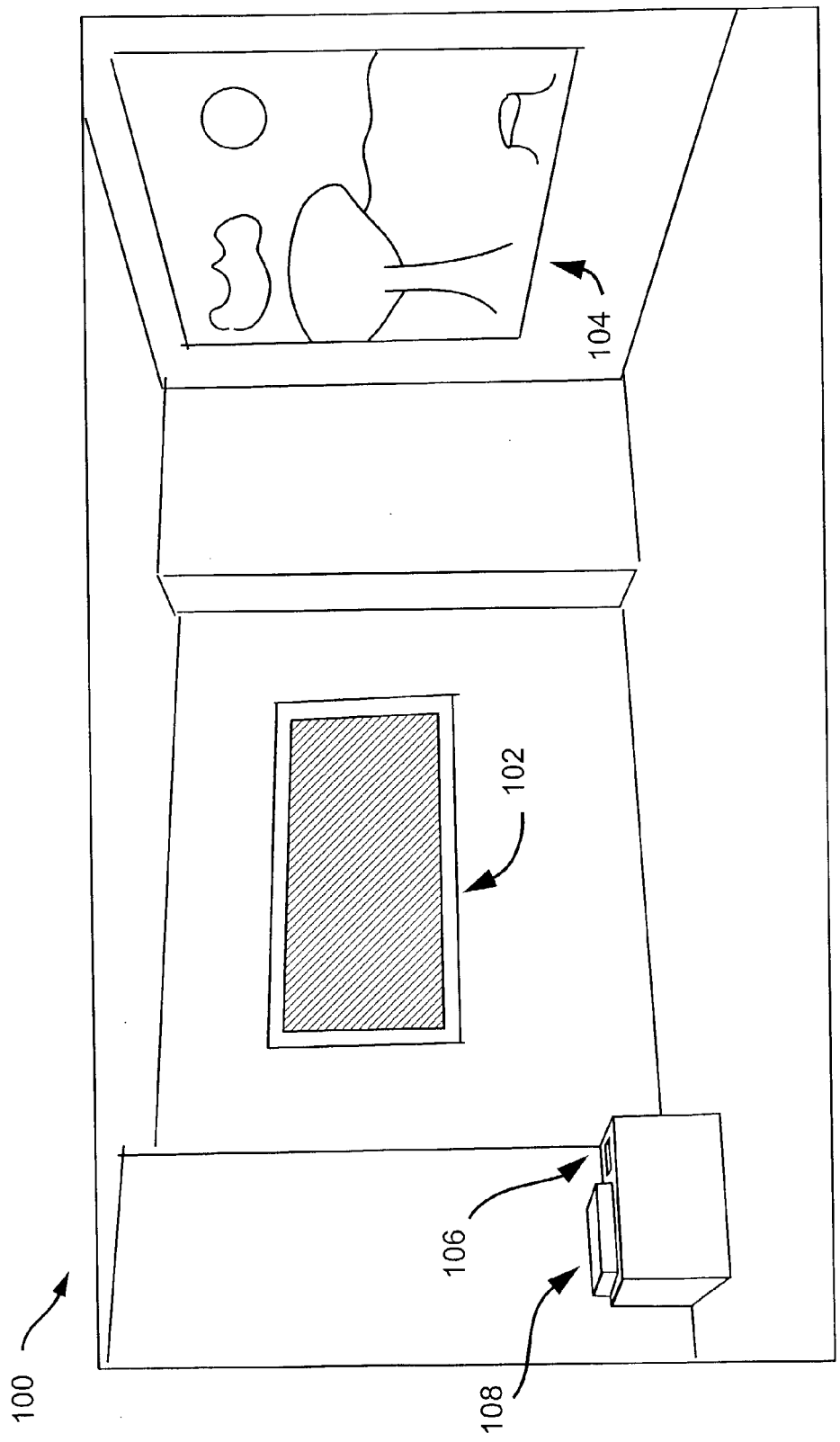
FIG. 1 shows an illustration of the preferred television system displaying a blank screen while in an OFF state.

Where reference is made in any one or more of the accompanying drawings to steps and/or features, which have the same reference numerals, those steps and/or features have for the purposes of this description the same function(s) or operation(s), unless the contrary intention appears.

The principles of the preferred system described herein have general applicability to display systems. However, for ease of explanation, the steps of the preferred system are described with reference to a television system. However, it is not intended that the present invention be limited to the described system. For example, the invention may have application to a personal computer system.

The following detailed description will be divided into several sections. The first of these will describe an overview of the system with reference to a television graphical user interface from a user's perspective. The second will describe the hardware of the system, and the method of operation of the system.

Overview

Turning now to FIG. 1 there is shown a room 100 having a window 104. Inside the room 100 there is shown the preferred television system comprising a television monitor 102, set top box 108, and a remote control 106. The preferred television system shown in FIG. 1 is currently OFF and the television monitor 102 in this OFF state is blank. The television monitor 102 is a large flat screen monitor hung from the wall of the room 100.

Figure 2:
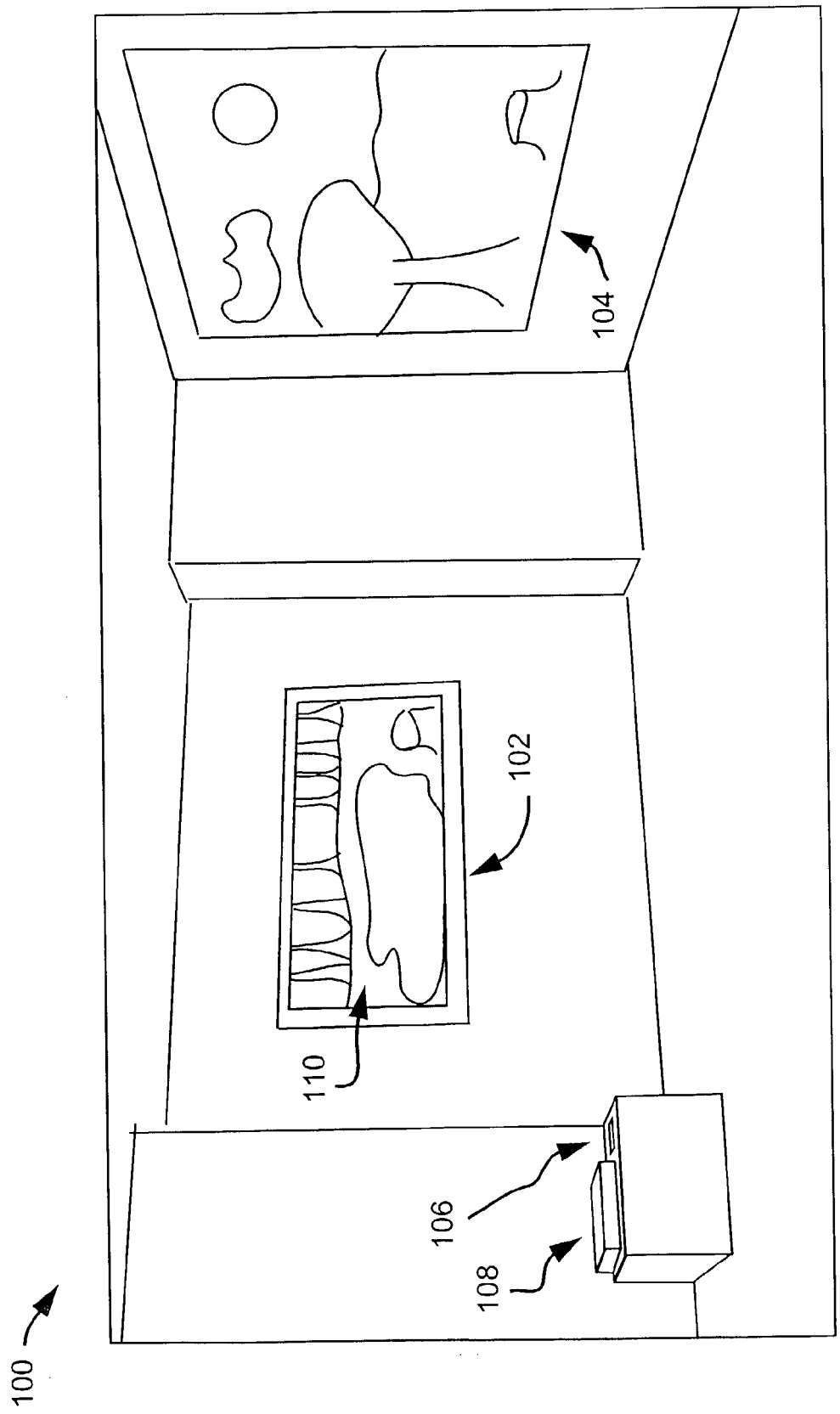
FIG. 2 shows an illustration of the same preferred television system shown in FIG. 1, but displaying a background scene for use during its standby state.

Turning now to FIG. 2 there is shown the same room and preferred television system shown in FIG. 1. The preferred television system shown in FIG. 2 has just been turned ON and a static display of a forest scene 110 is shown on the television monitor 102. As will be appreciated by persons skilled in the art, large flat screen monitors that are capable of being hung from the wall of a room are not yet commercially available. However, it is expected that such monitors will be commercially available in the near future. One foreseeable problem with such monitors is that they take up a large space of the wall and in their OFF state are not pleasing to the eye. It has been proposed that such monitors may in a standby state, instead of displaying a blank screen, display a selected static or animated scene. Thus the user can then select a static or animated scene for display on the monitor during the standby state that is pleasing to his or her eye.

The present preferred television system uses a static scene or semi-animated scene as a background for the standby state. The preferred television system also has the capability of displaying during the standby state a plurality of animated objects over this background, where the animated objects represent corresponding television programs and their times to their broadcast. Preferably, the animated icons are moved over the background in such a manner that a mere glimpse of the screen gives the user an intuitive idea about the approximate arrival-time of the broadcasts of the television programs. Furthermore, the animated objects are preferably of the form that is pleasing to the eye and are in conformity with the background image, eg. animated butterflies on a background image of a forest scene. Preferably, the type and configuration of the animated objects may be selected at the user's discretion, thus providing a degree of security from third parties. However, it is not intended that the present invention be limited to such an application. Indeed, the invention may have general application to the representation of any plurality of independent data items. In the general case, a multi-dimensional iconic representation is assigned to each data item; and at least one dimension of each iconic representation is altered according to a change in a corresponding state of the corresponding data item. For example, the invention may have application to a personal computer system comprising a screen saver using the animated icons in similar fashion to the preferred television system, but which icons signal the arrival of meetings/appointments.

Figure 3:
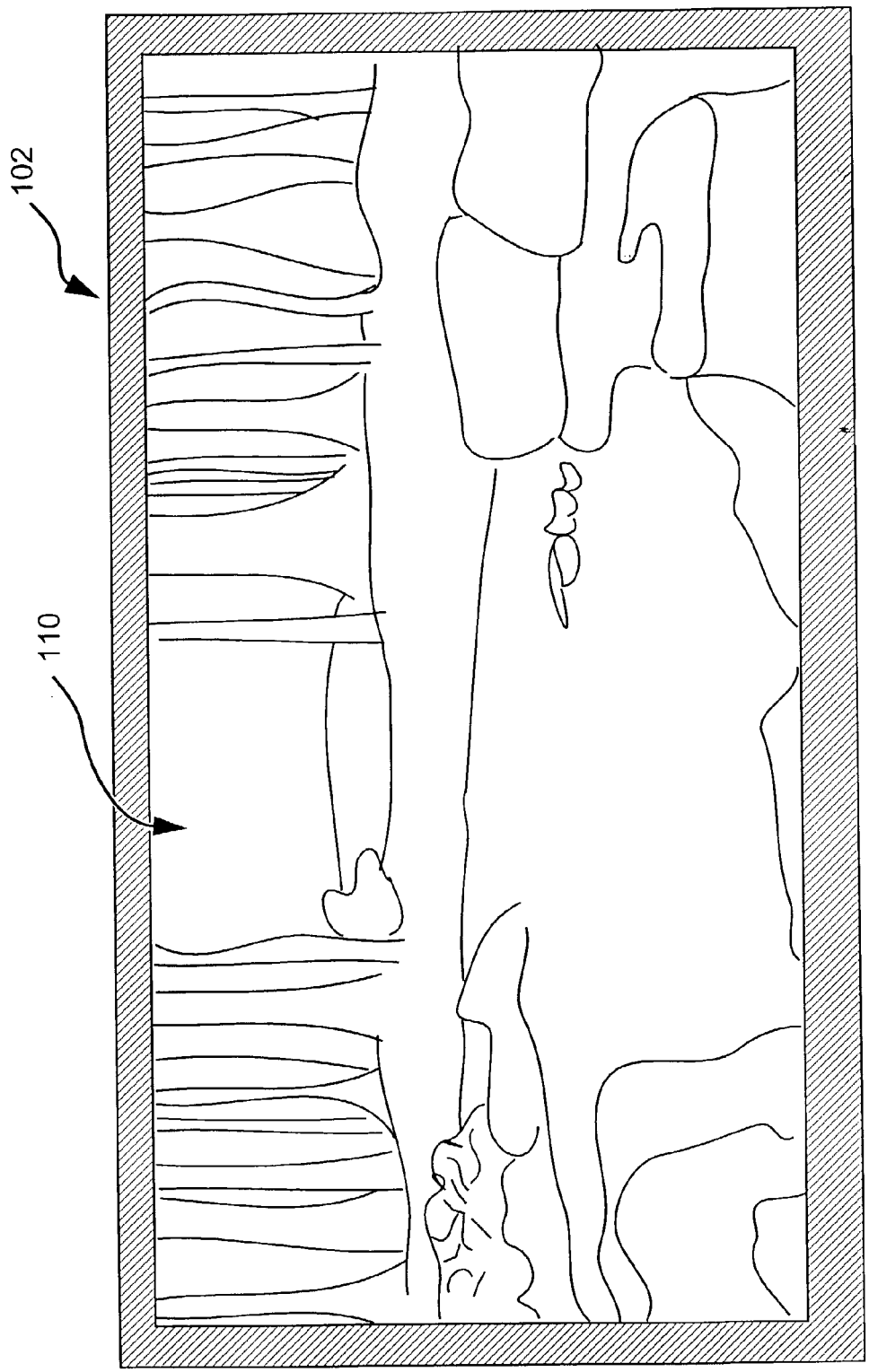
FIG. 3 shows an illustration of the television monitor of FIG. 2 in closeup.

Turning now to FIG. 3, there is shown an example of a line drawing of a static scene 110 that can be used as a background for display on the television monitor 102 of the preferred television system during its standby state. In this example, the static scene 110 is a detailed high colour resolution image of a forest scene. Preferably, this background scene is static. However in other variations, the scene can be semi-static with minor movement in the scene (eg. movement of the leaves of the trees and bushes). As further animated objects will be superimposed on this background scene, as will be described below, the movement of the static scene preferably should be minor so as to not detract from the movement of the further animated objects.

Figure 4:
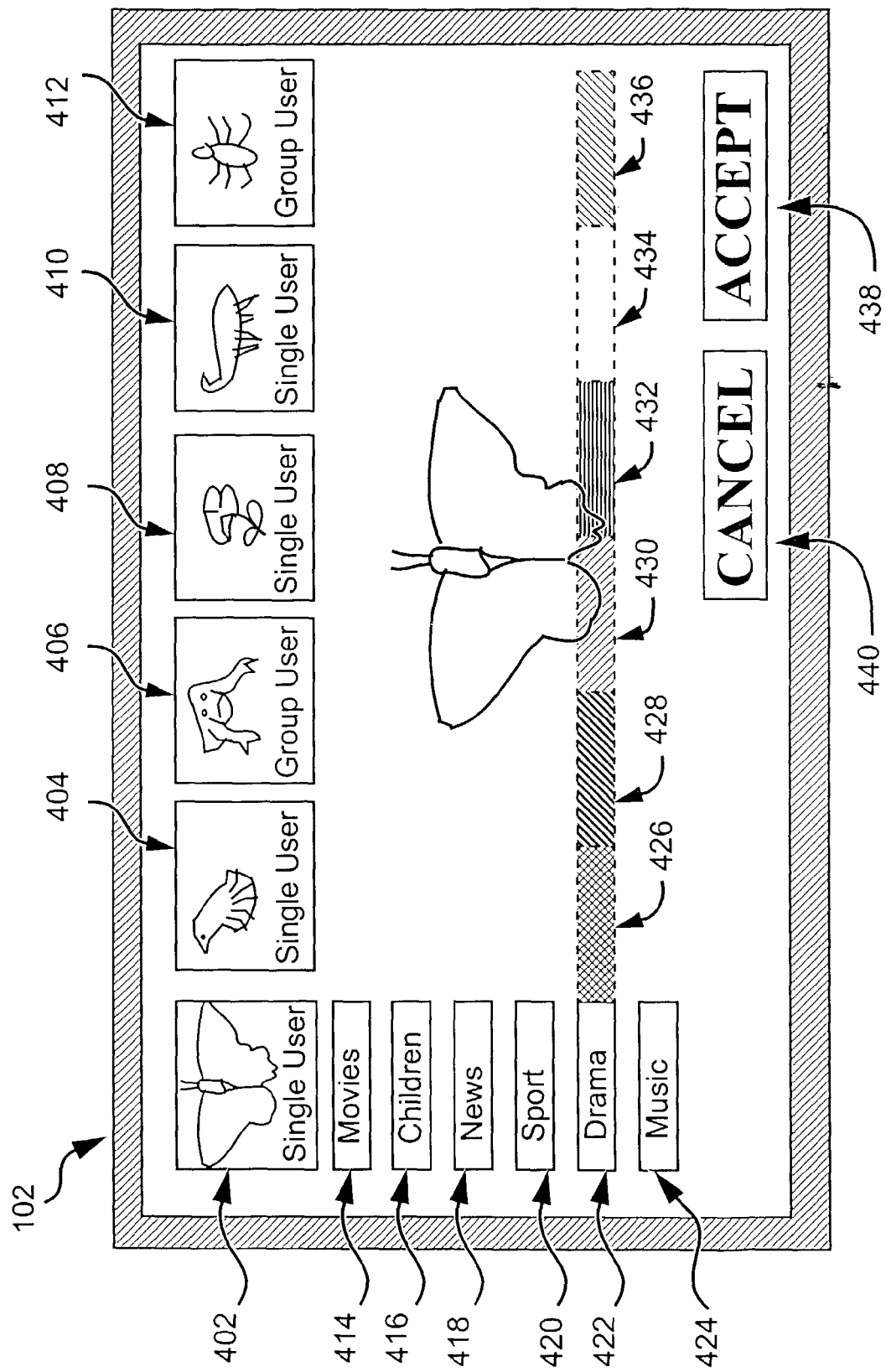
FIG. 4 shows an illustration of an exemplary configuration graphical user interface displayed on the television monitor of the preferred television system.
Figure 5:
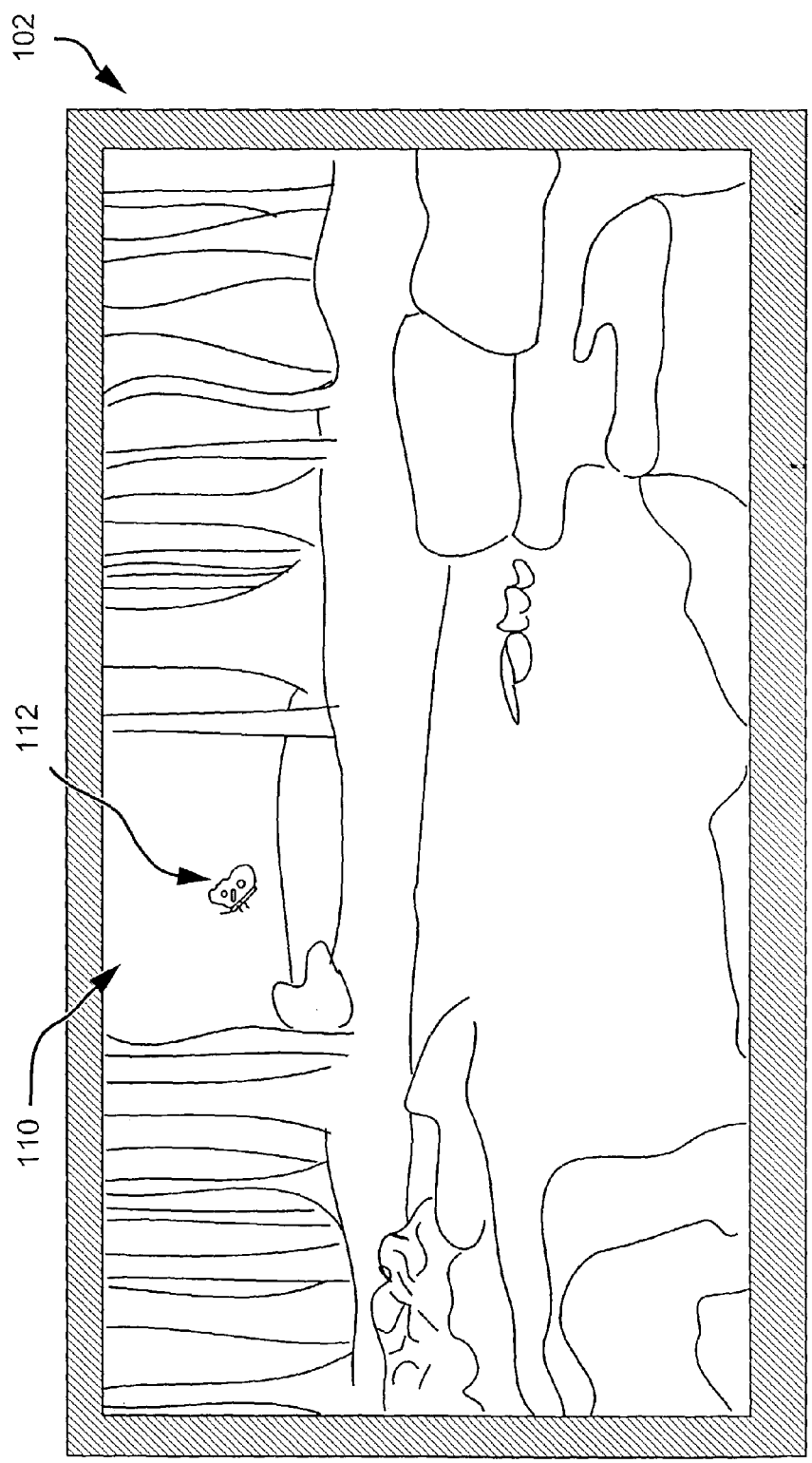
FIG. 5 shows an illustration of an exemplary television program graphical user interface in a first state displayed on the television monitor of the preferred television system.
Figure 6:
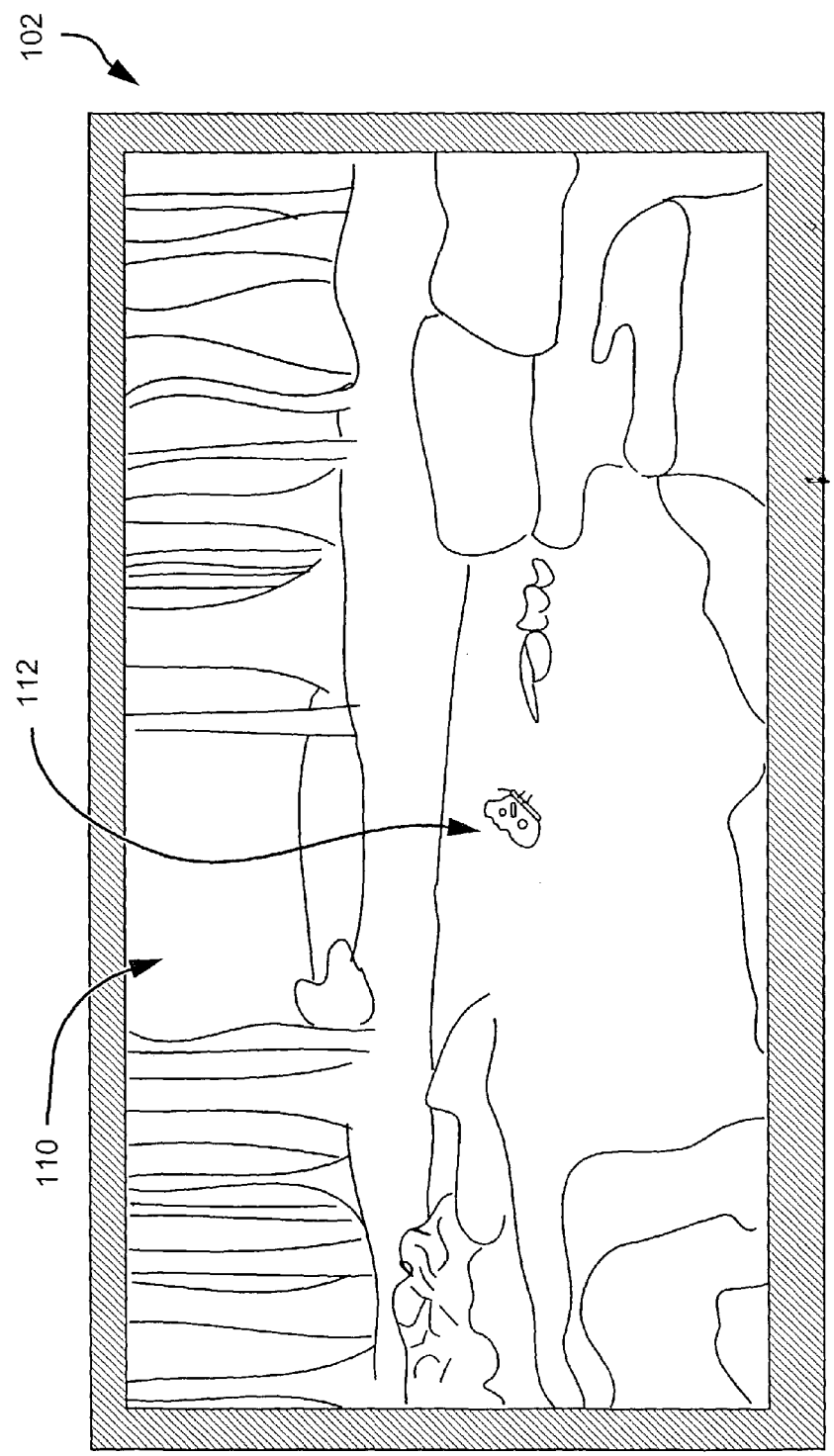
FIG. 6 shows an illustration of an exemplary television program graphical user interface in a second state displayed on the television monitor of the preferred television system.
Figure 7:
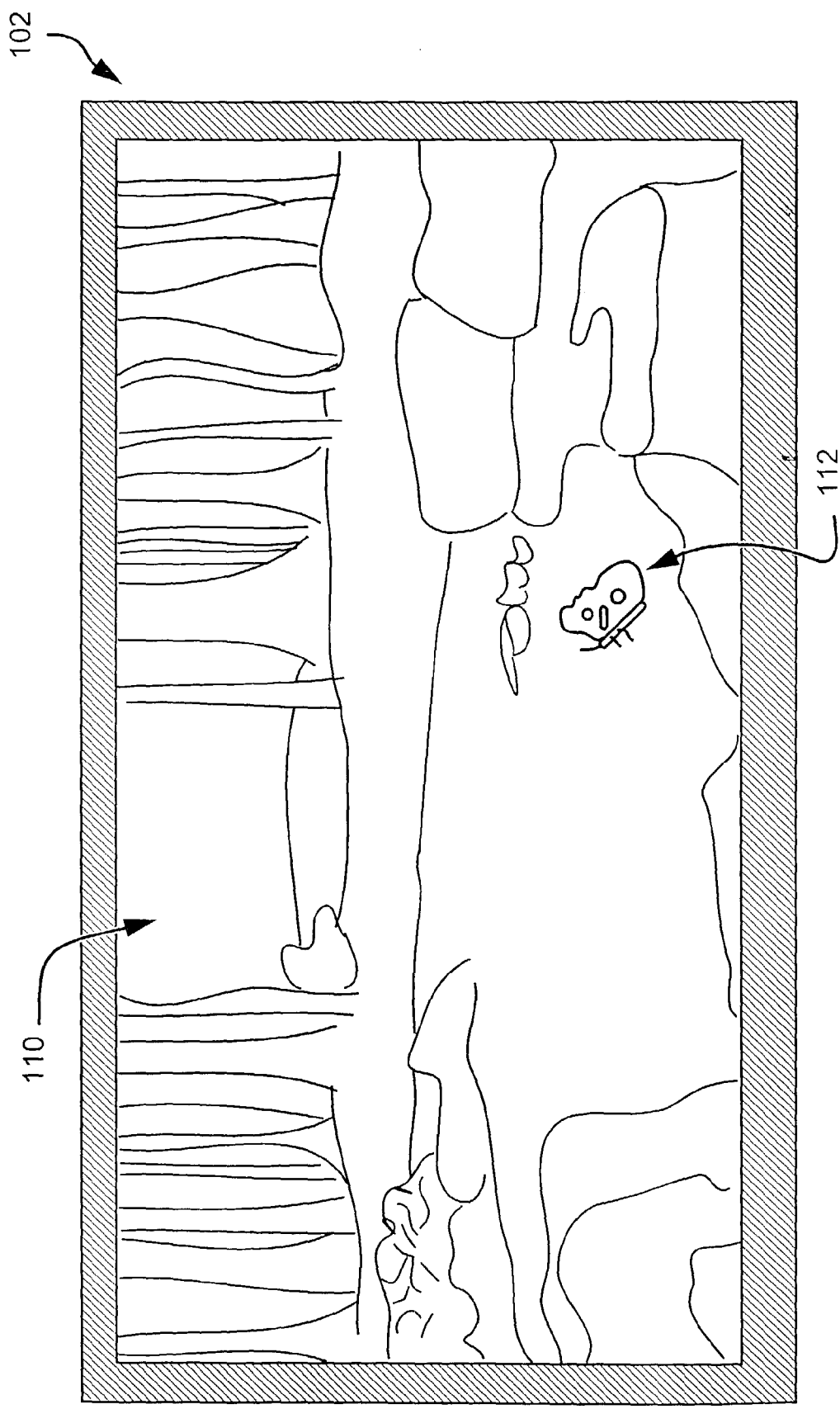
FIG. 7 shows an illustration of an exemplary television program graphical user interface in a third state displayed on the television monitor of the preferred television system.
Figure 8:
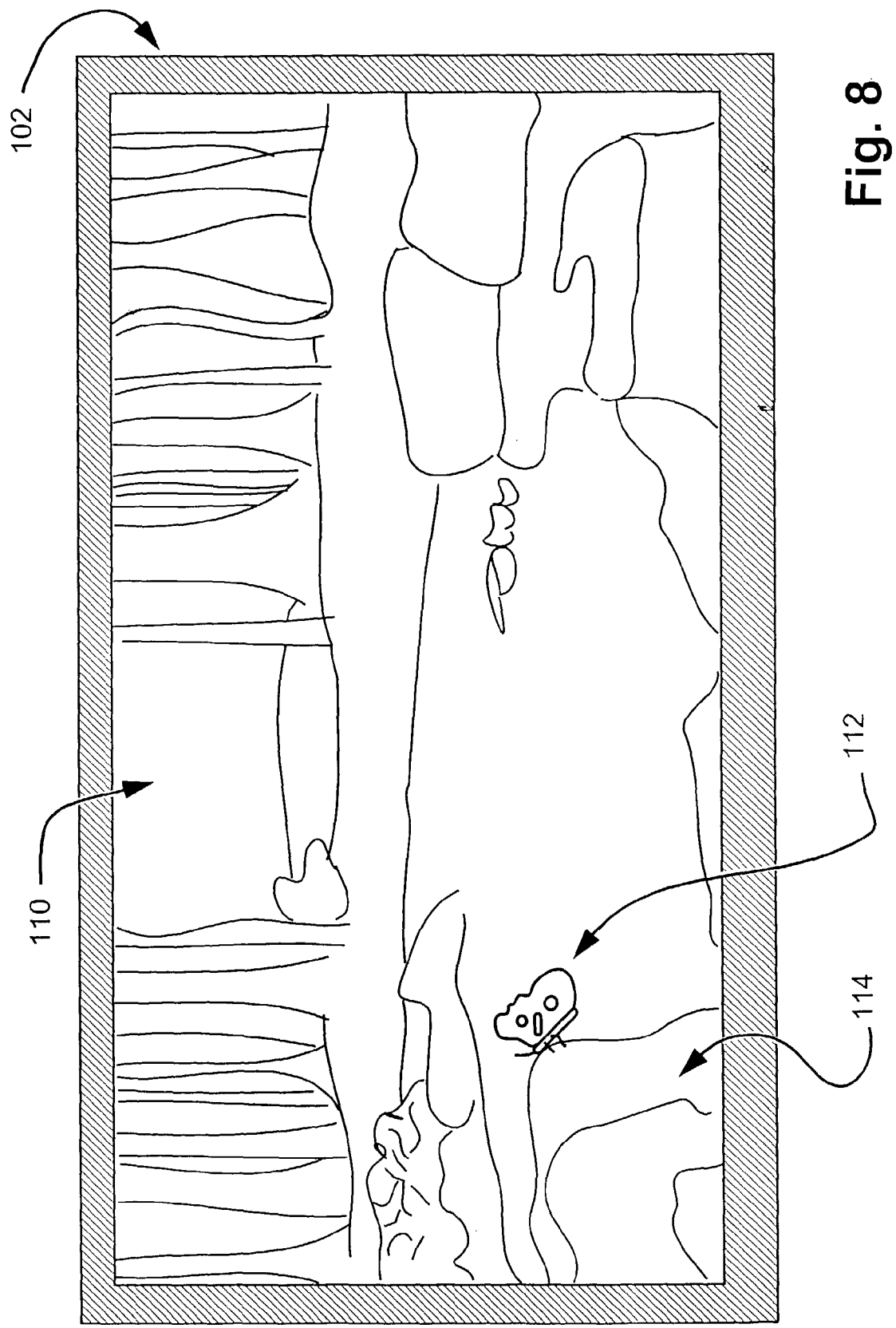
FIG. 8 shows an illustration of an exemplary television program graphical user interface in a fourth state displayed on the television monitor of the preferred television system.

Turning now to FIG. 4, there is shown an example of a configuration graphical user interface 400 displayed on the television monitor 102 of the preferred television system. For sake of clarity, the configuration graphical user interface is herein after called the configuration GUI 400. The user configures the parameters of the aforementioned animated objects of the preferred television system using this configuration GUI. The configuration GUI is displayed on the television monitor when the user turns on the television system for the first time, so as to configure the parameters of the animated objects of the television system. The configuration GUI may also be displayed at subsequent times when the user decides to change the parameters of the animated objects or add parameters for further animated objects.

These animated objects are icons in the sense that the state of the animation of the icon represents the state of a data item.

For example in a particular exemplary arrangement, the location of an animated icon in the display is a function of the current time, and represents the time remaining of the next television program of a particular type (ie. drama) to be broadcast on a television channel. In this particular example, the time remaining is measured from the current time to the time of the next television program of that particular type. Once the user has configured the animated icons, a graphical user interface herein called the television program GUI displays these animated icons superimposed on the static background. Preferably, the colour of the animated icon is representative of the type of television program. For instance, a blue butterfly may be representative of a drama program, whereas a yellow butterfly may be representative of a sports program.

The user configures the parameters of the animated icons via means of a remote control device comprising a number of keys and a touch sensitive screen, which will be described below in more detail. The user first selects one of the available animated icons (eg. butterfly) for the user's personal use or for use by a group of people by means of the touch screen and the displayed objects (402-412). The user then selects a desired category of television programs (eg. drama) by means of the touch screen and displayed objects (414-424). Once the user has selected the desired category of television programs a pull down menu is displayed showing a number of colour objects (426-436). The user then selects one colour (eg. blue) by selecting one of the displayed objects (426-436) for the animated icon to represent that category of television programs. For example, the user may select a blue butterfly as his or her animated icon to represent the time remaining for the next drama program to be broadcast. Finally, the user either selects the Accept object 438 or the Cancel object 440. In the event the user selects the Accept object, the selected parameters of the animated icons are saved for subsequent use by the television GUI. Otherwise, the user may choose to select the Cancel object, where the selected parameters are cancelled.

The aforementioned GUI may also include, thought not shown, a menu or sub-menu for saving parameters concerning the recording of a selected program. For example, a butterfly hovering around a pre-selected stationary position and flapping its wings represents that a television program that is associated with the butterfly is currently being recorded by the television system.

The configuration GUI 400 shows a specific graphic menu layout, however other menu arrangements of the configuration GUI are possible, without departing from the spirit or scope of the invention.

In the aforementioned example, once the user has selected his or her desired animated icons from the configuration GUI, the television system then interrogates a television program guide which is electronically stored in the system and which guide may be obtained via the Internet. The television system then determines from the program guide the next television program(s) subsequent to the current time belonging to the selected category. The system then measures for each of the aforementioned television programs, the time remaining before the television program will be broadcast and is able to shown on the television system. The television system uses this information in its display of the television program GUI.

Turning now to FIGS. 5 to 11 there is shown an example of a television program GUI displayed on the television monitor 102 of the preferred television system. This exemplary television program GUI shows in FIGS. 5 to 8 an animated icon 112 at a number of stages in the process of moving over the static background 110. In this particular example, the animated icon is an animated butterfly 112. The wings of this butterfly 112 are of a colour blue (not shown) indicating to the user that it is associated with television programs having a drama content. In this particular example, the user has previously configured the type and colour of the icon associated with television programs of a particular category (eg blue butterfly—drama) by means of the configuration GUI. The television program GUI then shows, the butterfly 112 moving from the background (FIG. 5), to middleground (FIG. 6), then to the foreground (FIG. 7) as the time progresses and finally lands (FIG. 8) on a rock 114 displayed in the foreground of the forest scene 110. In this particular example, the animated butterfly 112 intuitively indicates the time remaining to the next television program of a particular type (ie. drama) to be broadcast on a television channel. The animated butterfly 112 moving in the background (FIG. 5) of the forest scene 110 indicates that the next drama television program to be broadcast and able to be shown on the television system is still a long time away. The animated butterfly 112 moving in the middleground (FIG. 6) of the forest scene 110 indicates the drama television program is still some time away but not as long when the butterfly moved in the background. The animated butterfly 112 moving in the foreground (FIG. 7) of the forest scene 110 indicates that the drama television program is about to be broadcast. The animated butterfly 112 when it lands on the rock 114 of the forest scene 110 indicates that the drama television program is imminently about to be broadcast. The television system may also emit an audio alarm to draw the attention of the user when the program is about to be broadcast. The user may at anytime during the animation select an animated icon on the television monitor, and the television system in response will display a pop up window showing the details concerning the television program associated with animated icon. Such information may include the title of the program, start time, channel, cast etc.

In this particular example depicted in FIGS. 5 to 8 only one animated butterfly is shown, though the television system is capable of displaying a plurality of animated butterflies. For example, a butterfly of a particular colour say blue may represent the next drama television program to be broadcast, whereas a butterfly of another colour say red may represent the next sport television program to be broadcast. As the sport and drama programs may be scheduled for broadcast at different times, the butterflies representing these programs will be located at different locations within the forest scene. For example, the blue butterfly may be located in the foreground of the forest scene 110 indicating that the next drama program is imminently about to be broadcast. On the other hand, the red butterfly may at the same time be located in the background of the forest scene 110 indicating that the next sport program to be broadcast and able to be shown on the television system is still a long time away. In another example, a first blue butterfly may represent a first drama television program, and another blue butterfly may represent another drama television program. If both drama programs are scheduled at the same time on different channels, then both butterflies will be located at substantially similar locations within the forest scene 110, otherwise they will be located at different locations. In this fashion, a mere glimpse of the screen gives the user an intuitive idea about the relative arrival of independent events.

Figure 9:
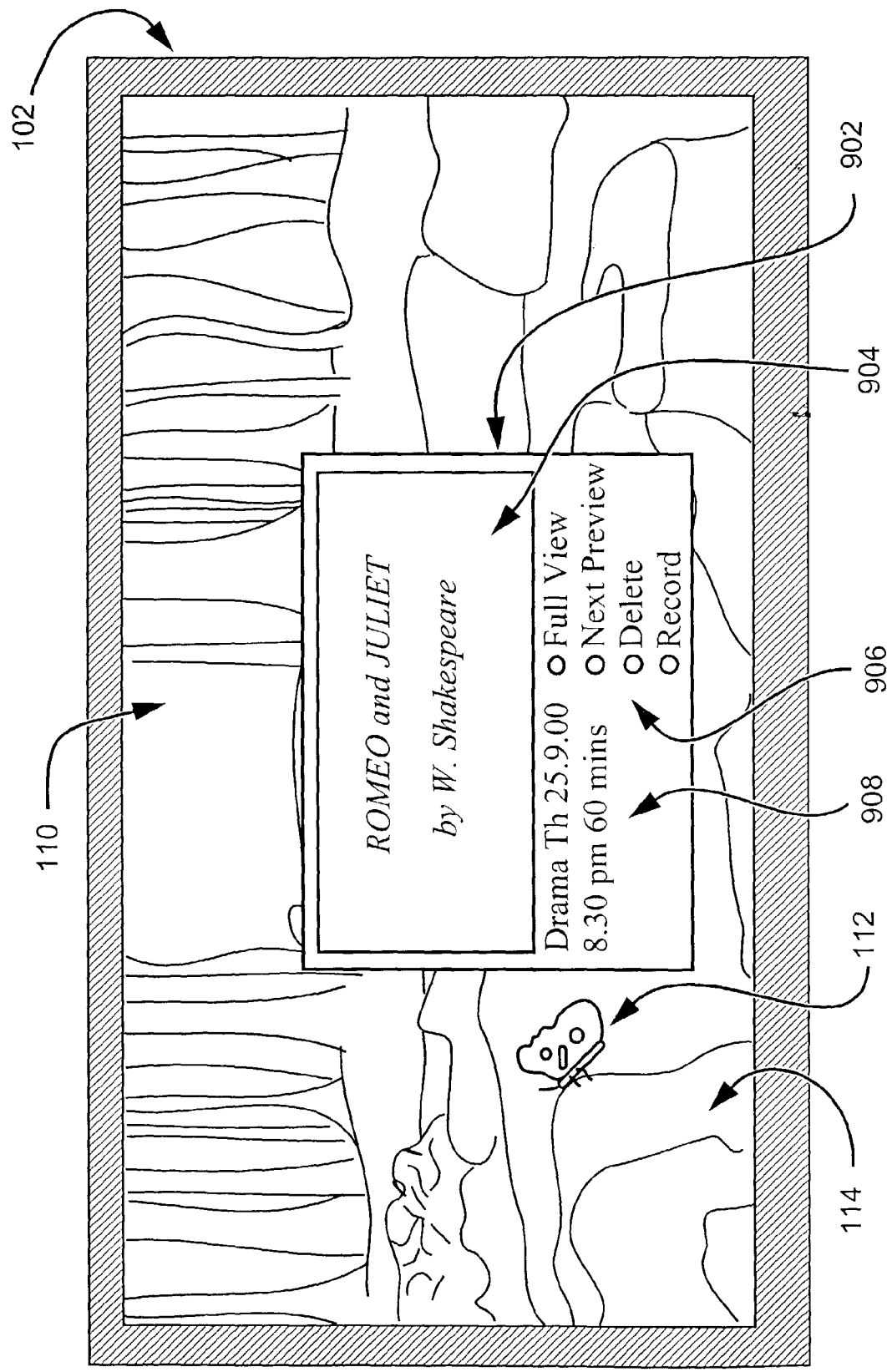
FIG. 9 shows an illustration of an exemplary television program graphical user interface in a fifth state displayed on the television monitor of the preferred television system.

Returning now to FIG. 8, the television program GUI will, after a short fixed duration since the animated butterfly 112 has landed on the rock 114, display a preview of the television program associated with the animated butterfly (FIG. 9). This preview is in the form of a small pop up window 902 comprising a small 'screen' 904 for displaying the preview of the television program (eg. Romeo and Juliet). The audio-visual data for the preview is preferably obtained from an online source, which supplies such previews on demand. Preferably, this audio-visual data is obtained some time in advance and stored in the television system prior to being displayed. The pop up window 902 comprises a menu 906 that displays the following options for user input: "Next Preview", "Full View", "Delete", and "Record". If there are more than one preview presently available for the current time, the user can cycle through these previews by activating the "Next Preview" button of the menu 906 by means of the touch screen of the remote control. If the user is not interested in watching the currently showing preview he or she may activate the "Delete" button. The butterfly associated with that preview will then fly away from the forest scene and will no longer be visible. If the user wishes to record and/or view the television program he or she activates the associated record and/or full view buttons. The pop up window 902 also preferably displays information 908 concerning the television program.

Figure 10:
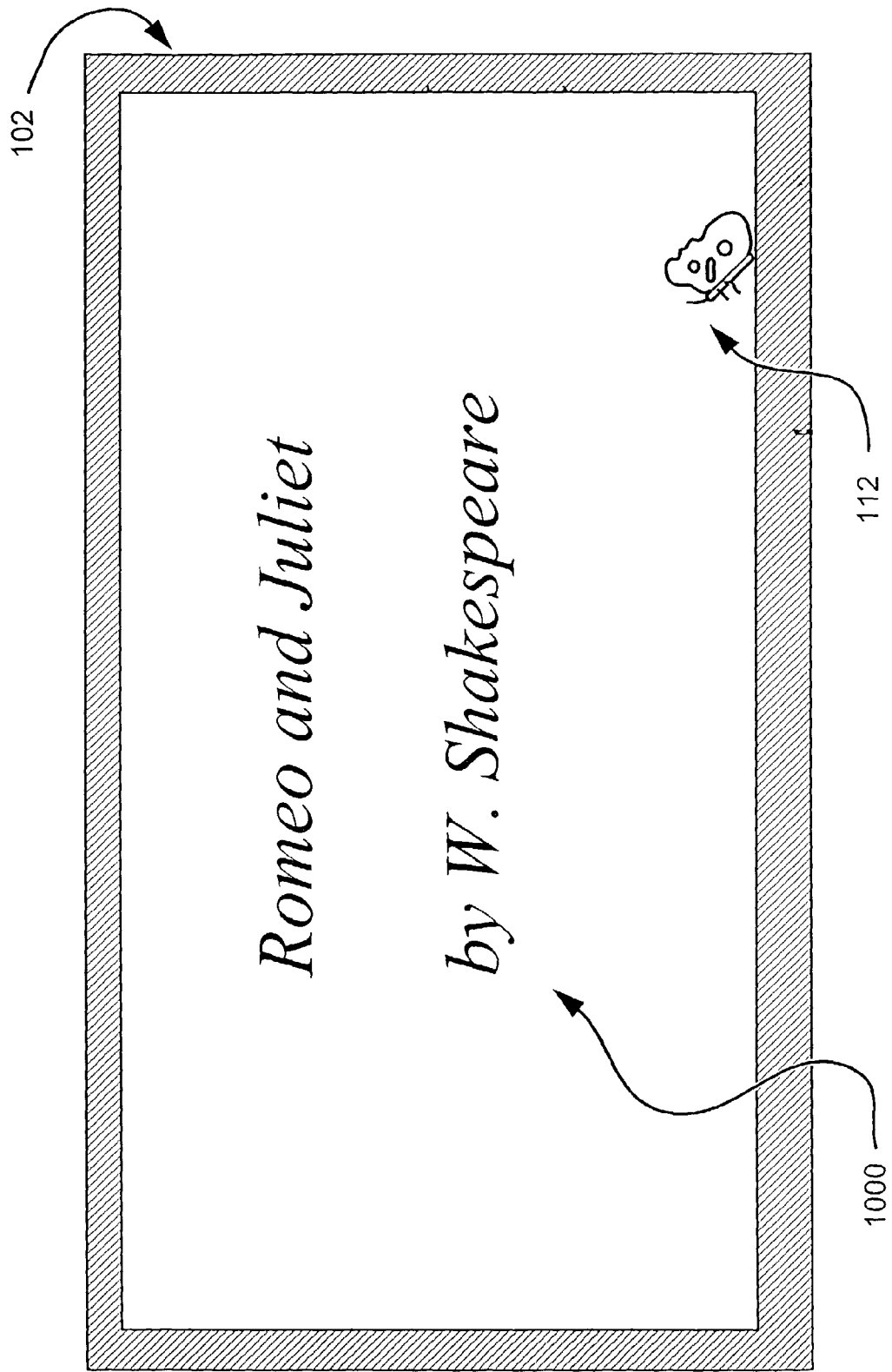
FIG. 10 shows an illustration of an exemplary television program graphical user interface in a sixth state displayed on the television monitor of the preferred television system.

Turning now to FIG. 10, there is shown the full screening of the television program selected by the user in FIG. 9. During the full screening of television program 1000, the associated animated butterfly 112 and other remaining butterflies stay stationary at the bottom of the screen. At the end of the full screening, the television displays once again the forest scene and the butterfly associated with that full screening will fly away and will no longer be visible. Any remaining butterflies will recommence flight in accordance with the time remaining to their respective broadcasts of their associated television programs in the manner previously described.

Figure 11:
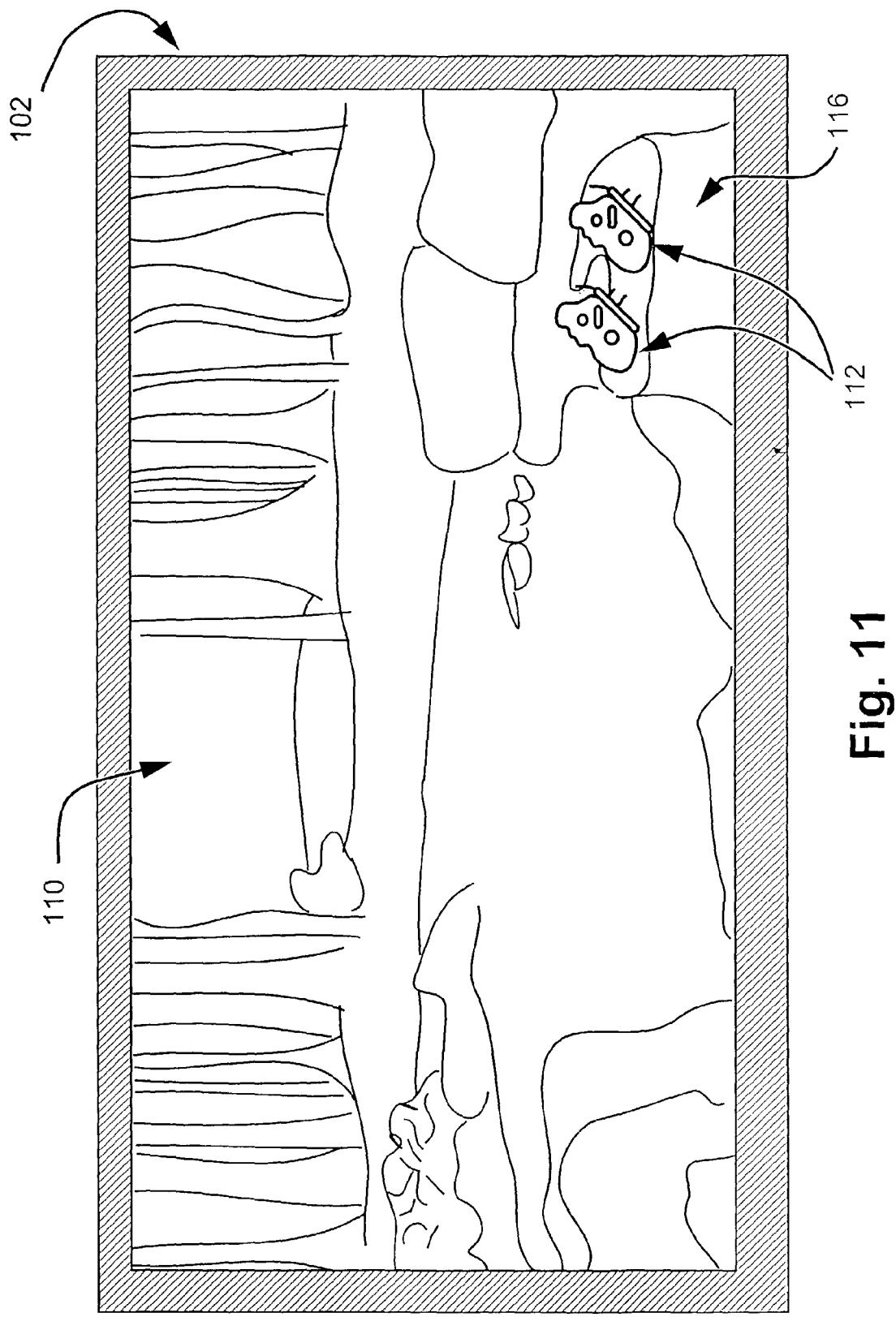
FIG. 11 shows an illustration of an exemplary television program graphical user interface in a seventh state displayed on the television monitor of the preferred television system.

Turning now to FIG. 11, there is shown the television program GUI, where a user has previously selected a television program for recording by means of the pop up window shown in FIG. 10. Once the user has selected a program for recording, its associated butterfly performs a pre-designated action such as fluttering in the foreground at a pre-designated location, so as to indicate the program is being recorded. Once the program has been recorded, the butterfly stops performing the pre-designated action and remains stationary, so as to indicate the program has been recorded. In this particular example, the latter 'recorded' pre-designated location is the tree trunk 116. The user may at anytime during the animation select an animated icon, and the television system in response will display a pop up window showing the details concerning the television program that is currently being recorded or that has been previously recorded.

In this way, the animated icon (eg. butterfly) signals the imminent arrival of events, the occurrences of which are known to the television system beforehand. The television system is not limited to such events being television programs. Other examples of events where such a-priori information may be used are meeting/appointment schedules. In the case, the television system comprises a calendar GUI also using animated icons in similar fashion to the television program GUI, but which icons signal the arrival of meetings/appointments. Animated icons (that may be configurable by the user of a display system) are moved over the display screen in such a manner that a mere glimpse of the screen gives the user an intuitive idea about the approximate arrival-time of the events. In the present example the animated icon is animated butterflies that may be configurable by a user to represent television programs and a particular colour of the butterfly may represent the arrival of a particular type of program, e.g., dramas. The user may further configure the television program GUI such that the dynamic position of the animated butterfly may represent various ranges of arrival times. For example, the butterfly at the top of the display screen may represent a drama to be 15 minutes away whereas butterfly at the bottom of the screen may represent a drama about to begin. To make the understanding by the user intuitive, the size and the viewing angle of the butterfly is automatically altered by the system in such a manner that a longer arrival time is represented by a smaller butterfly and vice versa. This approach gives the user a visual feeling about the 'distance' of the butterfly from the nearest point (e.g., the bottom) of the screen and this in turn intuitively gives the user an idea about the arrival time of the program content (e.g., drama) that the butterfly represents. Preferably, the user is able to select many other animated icons; e.g., blooming flowers where the degree of opening of flower petals may represent how much longer it may take for the relevant event to appear. The information about the events may be extracted from relevant information repositories, e.g., television electronic program guide (EPG) databases where events are television programs. Where events represent some form of appointment, the appointment information may be extracted from an electronic meeting scheduling system.

The user may also query the animated icons appearing on the display to get detail information about the events that they represent. Examples of such detail information in case of a television system are; particulars of the program including title, start-time, length, casts, channel, etc. A preview of the program may also be possible if such a preview content (e.g., a drama AV clip) is available. The animated icons may also alert the user on the arrival of relevant event by audio means. Multiple users may be simultaneously accommodated on the same display screen by having different icons (e.g., butterflies, birds and flowers) appearing in the same or separate windows. The background environment (e.g., a forest scenery) in which the animated icons move may be configurable by the user.

The users may also prioritize events so that these are shown distinctly. For example, in the case of television system if a user likes dramas and configures blue butterflies to represent them, then blue butterflies may appear brighter or shiny by some means from the rest of the butterflies that appear on the same display and represent various other programs.

The user may also configure an animated action for the icon to perform to indicate the recording status of a program. Such action is preferably specific to the type of icon for example, flapping its wings while remaining stationary for a butterfly. To represent that a program is recorded, the same icon may be positioned on another user configurable icon. For example, the user may configure the system to use a tree trunk in such a way that when a icon representing a program is positioned on the tree trunk, it signifies that the program is recorded. Furthermore, the eventual size of the icon when positioned on the tree trunk may indicate the length of the recorded program. Also, the relative position of the icons can indicate the chronological order in which the programs were recorded. That is, an icon representing a program that is positioned higher up on the tree trunk was recorded before those represented by icons that are positioned lower down on the tree trunk. The means for configuring the recording icons is not shown but however it will be apparent to a person skilled in the art that a GUI similar to the configuration GUI of FIG. 4 can be used for configuring such icons.

The user may query an icon to get detailed information about the recorded program that it represents. Such information includes the title, time and date of recording, length, channel, etc. A preview of the recorded program may also be displayed in a small window associated with the icon.

Television System

Figure 12B:
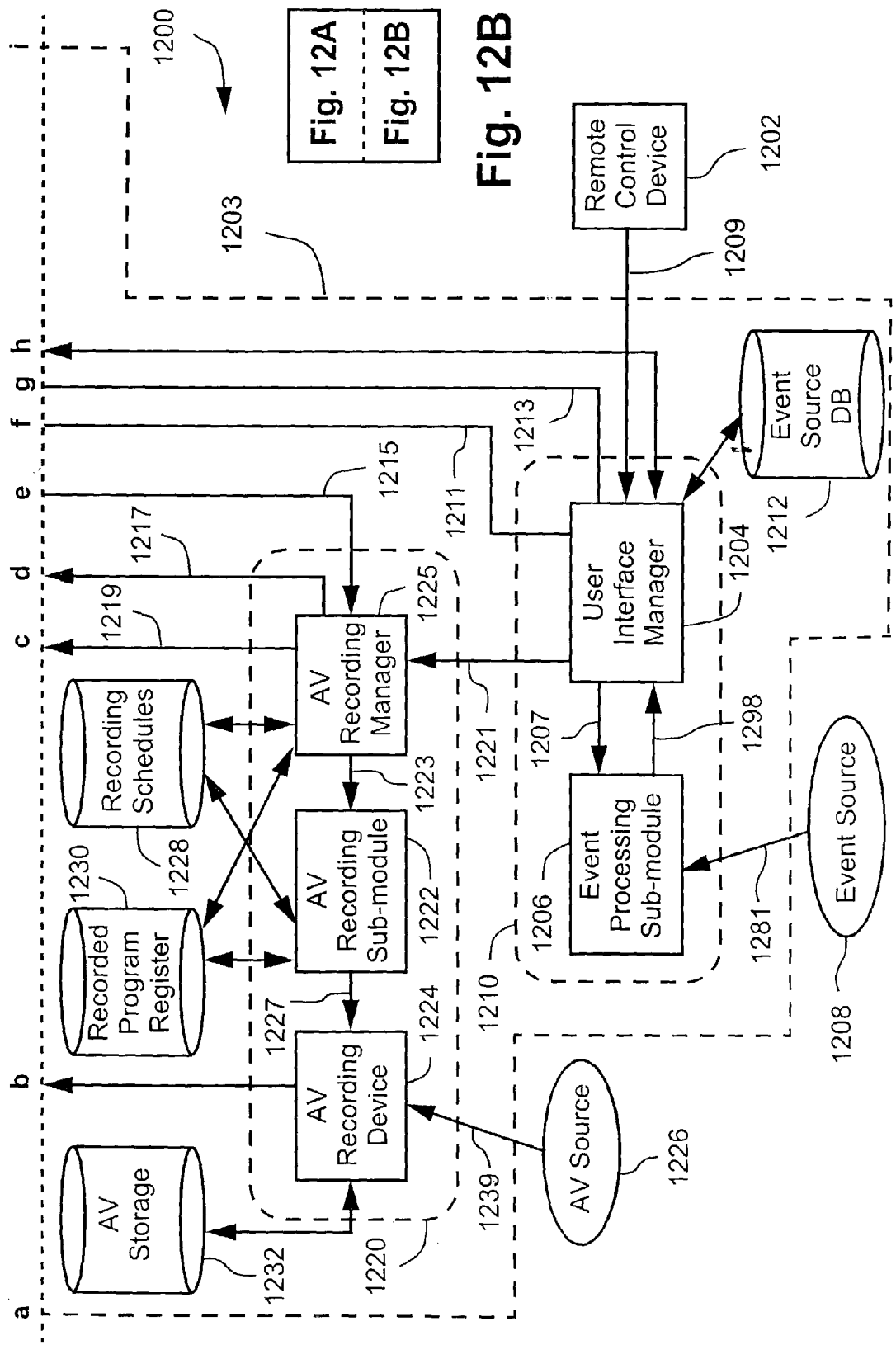

Turning now to FIGS. 12A and 12B, there is shown a schematic representation of the preferred television system

1200. The preferred television system 1200 comprises a remote control device 1202, a set top box 1203, and a television apparatus 1201 connected thereto. The television apparatus 1201 comprises a conventional television screen 1272 for displaying visual information and conventional speakers 1274 for producing accompanying audio. Preferably, the television apparatus 1201 has the capability of displaying television media and/or other audiovisual media. In a variation of the preferred system 1200, the system is directed rather than to a television apparatus but to a computer system comprising a computer monitor and speakers.

Figure 13:
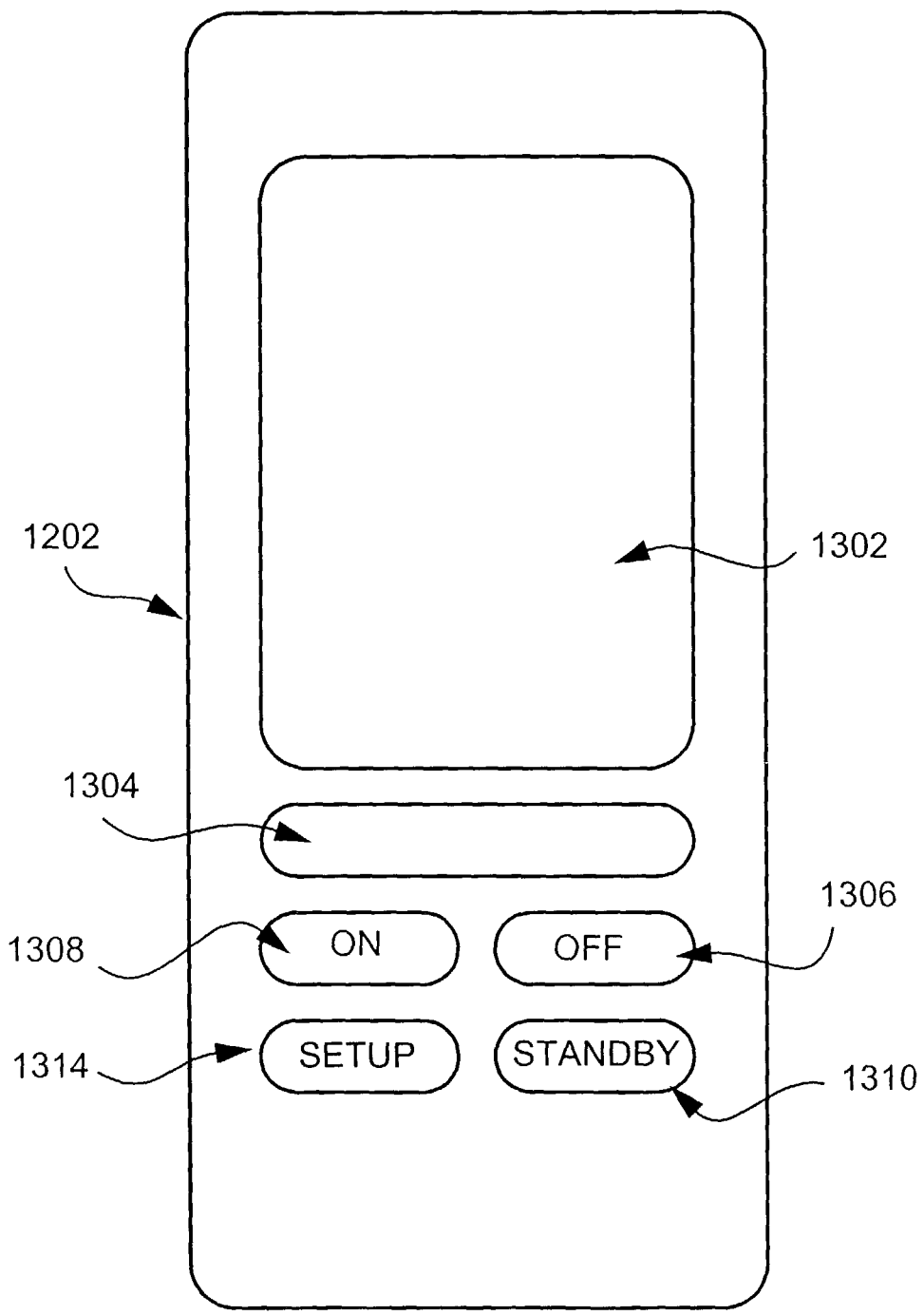
FIG. 13 shows an exemplary remote control device for interacting with the set top box of the television system of FIGS. 12A and 12B.

Turning now to FIG. 13, there is shown a remote control device 1202 for interacting with the set top box 1203 of the television system 1200 of FIGS. 12A and 12B. The remote control device 1202 comprises an ON button 1308 and OFF button 1306 for turning on and off the television system 1200. The remote control device 1202 also comprises a SETUP button 1314 for activating a configuration graphical user interface (herein called the configuration GUI) for display on the television monitor 1272. An example of such a configuration GUI is described herein with reference to FIG. 4. The remote control device 1202 also comprises a STANDBY button 1310 for activating a television program graphical user interface (herein called the television program GUI) for display on the television monitor 1272. An example of such a television program GUI is described herein with reference to FIGS. 5 to 11. The remote control device 1202 also comprises buttons 1304 (not shown) for implementing standard television functions (eg. increase volume, change channels etc). Preferably, the remote control device 1202 also comprises a touch screen 1302 for allowing user interaction with the configuration and television program GUIs that can be displayed on the television monitor 1272. The remote control device 1202 operates in a conventional manner, and generates coded signals indicating which buttons have been activated. The remote control device 1202 also generates, in a conventional manner, coded signals representing the x,y co-ordinates of a location on the touch screen 1302 that has been pressed by a user. In other variations of the television system, the remote control device may comprise a joy stick, key pad, mouse, and/or a microphone.

Returning now to FIGS. 12A and 12B, the set top box 1203 of the television system 1200 will now be described in more detail. The set top box 1203 comprises a user interface module 1210 for interfacing with the remote control device 1202, and a recording module 1220 for recording audiovisual signals. The set top box 1203 also comprises a graphics/text module 1240 for generating the television program and configuration GUI signals, and an output module 1260 for mixing and outputting audiovisual signals to the television apparatus 1201. The user interface module 1210 and graphics/text module 1240 communicate with each other via means of command signals on a bus 1211. Preferably, each of these modules is in the form of a dedicated integrated circuit. Alternatively, these modules may be implemented as a software program.

The set top box 1203 operates in one of three operating modes, a normal television operating mode, a standby mode, or a setup mode. The set top box 1203 at the end of the setup mode will automatically change to the standby mode. The set top box 1203 in its normal operating mode will operate in a conventional manner. During this normal operating mode, the graphic/text module 1240 is inactive and the output module is bypassed, while the user interface module 1210 and recording module 1220 operate in a conventional manner. The specific details of the normal operating mode of the set top box 1203 are not an essential part of the invention and consequently will not be described.

The set top box 1203 will first be described with reference to the setup mode. The set top box 1203 enters the setup mode the first time the set top box 1203 is switched on so that the user can configure the television program GUI. Subsequently, the user may instruct the set top box 1203 to enter the setup mode at any subsequent time to reconfigure the television program GUI. When the set top box 1203 enters the setup mode, the set top box 1203 generates the configuration GUI for display on the television monitor 1272.

The user interface module 1210 comprises a user interface manager sub-module 1204 and event processing sub-module 1206 coupled thereto. During the setup mode, the event processing sub-module 1206, recording module 1220, databases 1232, 1230, 1247, and 1228, and sources 1226, and 1208 are inactivated.

Once the user interface manager sub-module 1204 determines that the setup mode has been activated it sends a setup command signal 1211 to the graphics/text module 1240. The graphics/text module comprises a graphics/text manager 1245, a graphics/text processing sub-module 1248, and a database 1247 for storing the configuration and status parameters of the icons. The database 1247 stores and dynamically updates these parameters during the standby mode, which will be discussed in more detail below. On arrival of the setup command signal 1211, the graphics/text manager sub module 1245 looks-up the icon database 1242 and generates a list of icon options (e.g., butterfly, flower, bird, etc.) to be selected and configured (blue butterfly for drama, yellow butterfly for sports, etc.) by the user.

Specifically, when the graphics/text manager sub-module 1245 receives the setup command signal 1211, it then looks up the icon database 1242 to obtain the addresses of available icons. This icon database 1242 holds a-priori (initial) knowledge of available icon types and their source addresses. For example the icon database 1242 can comprise the following two fields: {icon type, icon source}, and example records can be: {butterfly, URL1}, {flower, CD}, {bird, URL2}, and so forth.

The graphics/text manager sub-module 1245 then sends these addresses as a signal 1241 to the graphics/text processing sub-module 1248. This signal 1241 specifies the address/location of icons to be extracted from a graphics/text icon source 1250. The address/location can be the URL of a remote web site or it can be a local database on a hard disk or CD. The graphics/text processing sub-module 1248 then uses the information obtained from the signal 1241, to extract the icons from the graphic/text icon source 1250. Preferably, the source is a database comprising graphics/text icons (e.g., butterflies, flowers, etc.) which typically have configurable animation capabilities (e.g., butterflies may fly, flowers may bloom, etc.). The database can be remote (e.g., web site) or local (e.g., hard disk, CD, etc.).

The graphics/text processing sub-module 1248 then generates and sends a continuous graphics/text stream 1249 to the output module 1260 for display of the icons for configuration on the television monitor 1272. This stream 1249 is generated by the graphics/text processing sub-module 1248 by activating a configuration GUI program stored in memory (not shown) which uses the extracted icons and a background image as a resource so as to obtain a configuration GUI. An example of a configuration GUI suitable for display is shown in FIG. 4.

The user configures the displayed icons by interacting with the displayed configuration GUI by means of the touch screen 1302 of the remote control device 1202. The user selects the desired menu option associated with the displayed icon by pressing the corresponding area of the touch screen 1302 of the remote control device 1202. The remote control device 1202 sends the menu selection information by means of x,y coordinates of the pressed area to the user interface manger 1204. The user interface manager sub-module 1204 interprets the received signal 1209 from the remote control device 1202 and relays the menu selection information by a signal 1213 comprising these x,y co-ordinates to the graphics/text manager sub-module 1245 and the configuration GUI program. Once the configuration of an icon is complete, the graphic/text manager submodule 1245 updates the user icon database 1244.

Preferably, the updated user icon database 1244 stores user assigned icon objects and their source addresses with the key typically being {UserID, Event type}. Other additional fields may include user assigned parameters such as: Degree of user's preference for events; Virtual time dimension measuring arrival of events (e.g., distance of butterfly/degree of opening of flower petals; etc. vs. arrival time); Maximum number of icon objects allowed simultaneously on display on the television monitor; Permission for automatic activation of preview window vs. range of time dimension, etc. For example, the user icon database 1244 can comprise following fields: user icon ID, userID, TV program type, degree of liking of TV program type, icon object, Icon colour, icon object source. Example records for users with UserID=2 and UserID=3 can be: {100, 2, drama, high liking, butterfly, blue, URL1}, {101, 2, Sports, medium liking, butterfly, yellow, URL1}, and {102, 3, movie, high liking, flower, red, CD}, and so forth.

The configuration GUI also allows the configuration of icons for representing television programs that are currently recording and icons for representing television programs that have been previously recorded. For example, the user may configure a recording animated action for the icon to perform to indicate the recording status of a program. Such action is preferably specific to the type of icon for example, flapping its wings while remaining stationary for a butterfly. To represent that a program is recorded, the user may, for example, configure the system to use a recorded program icon such as a tree trunk in such a way that when an icon representing a program is positioned on it, it signifies that the program is recorded. The recording animated actions and recorded program icons may be configured to be user-specific so that the programs recorded for a particular user are associated to the icon designated for that user. For example, the icons representing the programs recorded for User X are positioned on a tree trunk while those recorded for User Y are positioned on a fern. If a non user-specific object is configured, all recorded programs are associated to that icon. Once the configuration of these recording animated actions and recorded program icons are complete, the graphic/text manager sub-module 1245 updates the user icon database 1244 and the recording icon database 1246. Preferably, the user icon database 1246 comprises in addition to the fields described above the field {recording animated action}. Preferably, the recording icon database comprises the following fields {user iconID, recorded program icon}. An example record can be {101, tree trunk} etc.

Preferably, the user interface manager sub module 1204 also stores in a database 1244, the user's preferences for event types with the primary key typically being the user ID. This database 1244 may also store user password if appropriate. For example, a user icon database 1244 can comprise three fields comprising User ID, TV program type and the degree of liking. For example, records for users with ID=2 and ID=3 can be {2, drama, High}, {2, Sports, Medium}, {3, Movie, High}, and so forth.

Once the desired configuration of the icons is complete, the user presses an appropriate area (eg. ACCEPT—FIG. 4) on the touch screen 1302 of the remote control device 1202 and the set top box 1203 returns to the standby mode.

The set top box will now be described with reference to the standby mode. The set top box 1203 enters the standby mode every time the set top box 1203 is switched on and where the user has previously configured the icons for the television program GUI. When the set top box 1203 enters the standby mode, the set top box 1203 generates the television program GUI for display on the television monitor 1272.

During the standby mode, the user interface module 1210 is responsible to extract the appropriate event information and to generate specifications for creating the television program GUI to be displayed on the monitor 1272. The event information signal 1298 comprises extracted event data in the format required by the user interface manager sub module 1204. The event information signal 1298 may comprise TV program details, e.g., drama, title, drama, start time, channel, etc.

The user interface manager 1204 also receives and interprets any user input signal 1209 originating from the remote control device 1202 during the standby mode. The user input signal 1209 may be generated by a user during the standby mode for any of the following purposes. For example, the user may select an animated icon by pressing the appropriate location on the touch screen, and the x,y co-ordinates of this pressed location are received by and passed on by the user interface manager 1204 to the graphics/text module 1240 which generates a pop up window for that icon for display. The user can then select the appropriate function in the pop up window by pressing an appropriate location on the touch screen 1302, and an appropriate icon command signal is generated by the user interface manager 1204. Thus the user can select an animated icon selection and a command (eg. preview, playback, archive, erase, etc.) to be applied to the icon. The preview and playback commands are sent by the user interface manager 1204 to the graphics/text module 1240 as a user co-ordinate signal 1213 for processing. The archive and erase commands are sent to the recording module 1220 as an audiovisual recording command signal 1221 for processing. The user can also select a television program for recording in a similar fashion, by selecting an animated icon. In this case, the user interface manager 1204 sends a signal 1221 comprising the selection of a TV program to be recorded. This information is sent to the recording module 1220 as an audiovisual recording command signal 1221 for scheduling the recording.

The user interface manager sub module 1204 also controls the activities of the event processing sub module 1206 and produces a command signal 1211 for event specification and a recording command signal 1221 for recording the user's favourite programs.

The user interface manager 1204 will upon first entering the standby mode generate a signal 1207 instruct the event processing sub module 1206 to extract the appropriate event information. The signal 1207 comprises event processing specifications required for event extraction. For example, the event processing specification signal 1207 may comprise the following two types of parameters: an event source specification such as an web address, in case the event source is a remote web site, or a local database address in case the event source is a hard disk or CD; an event query specification such as input query parameters (e.g., current time and TV program type: drama) and required extracted query parameters (eg. title, start time, channel number). Using an internal clock, the user interface manager 1204 generates the event processing specification signal 1207 and sends this to the event processing sub-module 1206.

The event source addresses are preferably stored in an event source database 1212, which addresses are accessed by the user interface manager 1204 as required in order to generate the event processing specifications. Preferably, this database 1212 comprises a-priori (initial) knowledge of event source addresses. For example, an event source database can comprise the following four fields: {Event Source ID, Event Source name, Event Source type, Event Source address}. Specific examples are {1005, TBS-channel 7, TV, Broadcast transmission}, {5002, SBS-channel 6, TV, URL-1}, etc.

The input query parameters (other than the current time) required for generating the event processing specification signal 1207 are obtained from the user icon database. Some exemplary parameters are for example {ID=2, TV program type=drama, preference=high}, {ID=2, TV program type=sports, preference=medium}

The event processing sub-module 1206, in response to an event processing signal 1207, obtains appropriate event information from an event source 1208 and sends this event information to the user interface manager 1204 by means of the event information signal 1298 for a predetermined range of time intervals. Preferably, the animated icons are displayed only for a predetermined limited period of time. Thus event information concerning the desired animation of icons is needed to be extracted prior to this period of time. The user interface manager sub-module preferably generates event processing specifications on a regular basis during the standby mode, so that the event specification signal 1211 may be continually updated. The event information is extracted from an event source 1208 by means of an event extraction signal 1281, which may be in the form of a SQL query. The event source 1208 may either be in the form of a database or a television broadcast comprising information about the television program. For example, the event source 1208 can be a database on information related to program type, title, channel, program day/time, length, cast, etc. The event source database 1208 can be remote (e.g., web site) or local (e.g., hard disk, CD, etc.). Such event source information may include an electronic program guide.

The event processing sub-module 1206 receives from the event source the event extraction signal 1281 preferably in the format maintained in the event source 1208. On the arrival of the event extracted signal 1281, the event processing sub module 1206 re-formats the event information to match the requirements of the user interface manager 1204. After re-formatting, the event processing module 1206 transfers the event information by means of event information signal 1298 to the user interface manager 1204. For example, the user interface manager sub module 1204 may require only partial information (e.g., title and start time of dramas but not the channel number or the cast) comprised in the extracted event records. So re-formatting of the extracted event records may take place in the event processing sub module 1206.

The event information is then transferred to the graphics/text module 1240 by means of the event specification signal 1211. The event specification signal 1211 specifies the user and event information. This signal is generated on arrival of the event information signal 1298 as explained above.

The user interface manager 1204 also generates an audio-visual recording command signal 1221 to schedule the recording of user's favourite programs in response to specified user input 1209. Preferably, a television program can be scheduled for recording by the set top box 1203 in one or two ways, manual or automatic. In the manual mode, the user manually selects using the remote control device 1202 an animated icon that in turn generates a pop up window. The user then manually selects again using the remote control device 1202 the program associated with the icon, if desired, for recording. This selection is sent to the user interface manager 1204 as a user input signal 1209 and the user interface manager 1204 then sends an appropriate AV recording command signal 1221 to the recording module 1220 to schedule the recording. In the automatic mode, the program information in the event information signal 1298 is checked against the user icon database 1244 to determine whether the program is of a favourite type as configured by the user. If so, the user interface manager 1204 generates an AV recording command signal 1221 to record the program for the user automatically.

The set top box 1203 also comprises a recording module 1220. The recording module 1220 is responsible for recording TV programs that are manually preset to be recorded or automatically by configuring the favourite types of programs. The recording module 1220 comprises an audio-visual recording manager 1225, an audio-visual recording sub-module 1222 and an audio recording device 1224.

The audio-visual recording manager 1225 is responsible for scheduling the recording of programs and interfacing with other collaborating modules, namely, the user interface module 1210 and the graphics/text module 1240. The primary tasks of the audio-visual recording manager 1225 during the standby mode are as follows.

The audio-visual recording manager sub-module 1225 is adapted to add/update/delete entries in recording schedules database 1228 for scheduling the recording of programs according to an audio-visual recording command signal 1221 received from the user interface manager 1204. Preferably, the audio-visual recording command signal 1221 may comprise information such as program ID, channel, start-time and end-time that is required for recording a program. This information is stored in recording schedules for the audio-visual recording sub-module 1222 to access until the specified program is recorded. The recording scheduling database 1228 comprises an entry for each program the user has preset for recording. The entry comprises the program ID, channel, title and start-time and end-time of the program to be recorded.

The audio-visual recording manager sub-module 1225 is also adapted to, on arrival of an audio-visual recording command signal 1221 comprising a command for archiving or erasing a recorded program, delegate the task to the audio-visual recording sub-module 1222 by sending it an audio-visual command signal 1223. The audio-visual recording manager sub-module 1225 has also the task of, on arrival of an recorded program command signal 1215 for playback, instructing the audio-visual recording manager sub-module 1225 to playback the recorded program specified in the signal by sending it an audio-visual command signal 1223. This recorded program command signal 1215 may comprise a command for either a preview or full-playback of a recorded program. For a preview, brief sample clips are extracted from the recorded program.

The audio-visual recording manager sub-module 1225 is also adapted to retrieve, on arrival of a recorded program command 1215 for the retrieval of recorded program details, the requested details from the recorded program register 1230 and send it to the graphics/text module 1240 module via the recorded program info signal 1219. The recorded program register 1230 preferably comprises an entry for each program recorded or being recorded. The entry comprises the program id, status (recording, recorded, archived), title, start-time, duration and the address for retrieving the audio-visual content of the recording. For example, when the user queries the details of a recorded program, the details such as title and duration are retrieved and sent to the graphics/text module 1240 for generating and formatting the text to be displayed to the user.

The audio-visual recording manager sub-module 1225 also has the responsibility for checking the recorded program register 1230 and notify the graphics/text module 1240 when the recording of a program is started or ended by sending a recording program event signal 1217. The signal comprises an identifier of the program and a status to indicate whether the recording is started or ended. That is, when the recording of a program is started, the audio-visual recording manager sub-module 1225 sends a recording program event signal 1217 to the graphics/text module 1240. The graphics/text text module 1240 then updates the icon object representing the program being recorded to perform the animated action to indicate that the program is being recorded. For example, when the recording of a program is started, the signal comprises the status of "recording" and the program id of the program being recorded. On receipt of this signal the graphics/text manager 1245 updates the corresponding icon object to perform the animated action such as flapping the wings of the butterfly to indicate that the program is being recorded. When the recording is ended, the audio-visual recording manager 1225 sends a recording program event signal to the graphics/text module so that the icon object can be updated to show that the program has been recorded, eg. showing the blue butterfly remaining stationary on the tree trunk. On receipt of this signal, the graphics/text manager 1245 updates the corresponding icon object to stop the animated action.

The recording module 1220 also comprises an audio-visual recording sub-module 1222, which is responsible for controlling the recording and playback of a program. The primary tasks of the audio-visual recording sub-module 1222, during the standby mode, are as follows.

The audio-visual recording sub-module 1222 is responsible, on arrival of an audio-visual command signal 1221 comprising a full-playback or preview command, for instructing the audio-visual recording device 1220 to playback the full recording of the program or to sample clips from the program respectively. The audio-visual recording sub-module 1222 is also responsible, on arrival of an audio-visual command signal 1221 comprising a command for erasing a recorded program, for sending a recording device operation signal 1227 to the audio-visual recording device 1224 to erase the recorded program from storage 1232. The audio-visual recording sub-module also removes the entry corresponding to the specified erased program from the recorded program register 1230. The audio-visual recording sub-module 1222 is also adapted, on arrival of an audio-visual command signal 1221 comprising a command for archiving a recorded program, to update the entry corresponding to the specified program in the recorded program register 1230 to indicate that it is archived. The audio-visual recording sub-module 1222 is able to automatically erase any recorded programs that are over a pre-configured period of time and have not been archived by sending the audio-visual recording device 1224 an audio-visual command signal 1227.

The audio-visual recording sub-module 1222 is also adapted to check recording schedules in the recording schedules database 1228 which comprises entries of the programs to be recorded and instruct the audio-visual recording device 1224 to start or stop recording accordingly by sending it a recording device operation signal 1227. It also updates the recorded program register 1230 to indicate the recording status of a program. For example, the audio-visual recording sub-module 1222 checks and determines the next program to be recorded, eg. channel 2 from 10 pm to 11 pm. at say 10 pm. The audio-visual recording sub-module 1222 then sends a recording device operation signal 1227 to change to the channel to channel 2 and to start recording, and adds an entry in the recorded program register 1230 to show that the program is being recorded. The audio-visual recording sub-module 1222 then at 11 pm sends a recording device operation signal 1227 to stop the recording and updates the entry in the recorded program register to indicate that the program is recorded.

The audio-visual recording sub-module 1222 is coupled to an audio-visual recording device 1224. The audio-visual recording device 1224 is responsible for the actual recording and playback of a program as specified by the recording device operation signal 1227. The audio-visual recording device 1224 has the same functionality as a conventional recording device and may be incorporated in the set top box 1203. Alternatively, the functionality of the audio-visual recording device 1224 can be fulfilled with a common audio-visual recorder such as a VCR or DVD-RW recorder connected to the set-up-box 1203. In addition, an interface is required to enable the set top box 1203 to operate the audio-visual recorder. For a VCR, such interface may be an IR transmitter that is controllable by the set top box 1203 to generate the required remote control signal to operate the VCR. For a DVD-RW recorder, control signals may be passed from the set-top-box via the same IEEE 1394 connection used to connect the DVD-RW recorder to the set-top box 1203.

The primary tasks of the audio-visual recording device 1224, during the standby mode are as follows. The recording device 1224 is able to set the specified channel, and receive and decode (if necessary) the audio-visual signal 1239 from the audio-visual source 1226 in response to an appropriate recording device operation signal 1227. The recording device is adapted to send this audio-visual signal 1235 to the output module 1260. The audio-visual source 1226 can be a database comprising audio-visual objects (e.g., mpeg-2 clips) or a broadcast transmission comprising audio-visual contents. The database can be remote (e.g., web site) or local (e.g., hard disk, cd, etc.). The recording device 1224 also has the responsibility for recording the program on the current channel from the audio-visual source 1226 onto audio-visual storage 1232. The recording device 1224 has the further capability of playing back a recorded program from audio-visual storage 1232 to generate the audio-visual stream signal 1235. It can also erase a recorded program from storage 1232.

The graphics/text module 1240 comprises a graphics/text manager sub-module 1245, a graphics/text processing sub-module 1248, and a dynamic icon database 1247. The graphics/text module 1240 is responsible for extracting icon objects from graphics/text source 1250 and to process them to produce a continuous graphics/text stream 1249. The continuous graphics/text stream 1249 comprises animated icons represented in a format suitable for mixing with other AV contents (e.g., images, audio, video, etc.) in the output mixer 1262. Preferably, the continuous graphics/text stream 1249 may comprise sets of time sequenced graphics images of icon objects (e.g., butterflies, flowers, etc.) for generating their animated versions (e.g., butterflies flying, flowers blooming, etc.). The graphics/text icon source 1250 is a repository of such animated icons. The graphics text module 1240 is also responsible for generating an output specification signal and recorded program command signal for the output manager sub-module 1264 and for the recording module 1220 respectively. The recording module 1220 is responsible for previewing a designated recorded program when instructed by the graphics/text module 1240.

The graphics/text module 1240 has two sub modules, the graphics/text sub-module 1248 and coupled thereto a graphics/text manager sub-module 1245. The graphics/text manager 1245 controls the activities of the graphics/text processing sub module 1248 and interfaces with the other three modules, namely, the user interface module 1210, the recording module 1220 and the output module 1260. The output module 1260 is responsible for producing a multimedia GUI video signal 1276,1278 for the television apparatus 1201.

During the setup mode, the graphics/text manager sub-module 1245 generates a list of icons for display to be selected by a user and builds a user icon database 1244, as has been previously described. During the standby mode, the graphics/text manager sub-module 1245 is adapted to perform the following tasks.

The graphics/text manager sub-module 1245 is adapted to generate a graphics/text extraction signal 1241 on arrival of the event specification signal 1211 {eg. ID=2, event type: drama, arrival time: 15 minutes, title: Romeo and Juliet etc}. In response to the event specification signal 1211, the graphics/text manager 1245 accesses the appropriate location {eg. ID=2} in the user icon data base 1244 for obtaining data concerning user configured icons and their source addresses {eg. ID=2, event type: drama, degree of liking: high, icon object: butterfly, icon colour: blue, address: URL1}. The graphics/text manager 1245 uses this data to formulate an extraction signal 1241. The graphics/text extraction signal 1241 specifies the address/location and type of graphics/text icon object to be extracted, which is sent to the graphics/text processing sub-module 1248. For example, on arrival of an event (e.g, a drama about to begin) as specified in the event specification signal 1211, the graphics/text manager sub module 1245 looks up the user icon database 1244 and obtains the source address (e.g., a remote web site) for extracting the icon object (e.g., a butterfly) from the graphics/text source 1250. The graphics/text processing sub-module 1248 then addresses the appropriate address/location of the graphics/text icon source 1250 and queries the source 1250 using the address/location and other query parameters specified in the extraction signal 1241. The graphics/text processing sub module 1248 obtains, from the graphics/text source 1250 at this address/location, data representing the icon object preferably in the format maintained in the source 1250. For example, the extracted icon may represent objects like butterflies, flowers, etc. All these graphics objects should be configurable to present them as animated icons. On arrival of the extracted icon object, the graphics/text processing sub-module 1248 then re-formats the icon object to match the interface requirements of the graphics/text manager 1245 and generates a graphics/text information signal 1290. This signal 1290 comprises the characteristics of the extracted animated icon object. For example, these characteristics are preferably the processing (e.g., decoding) requirements for generating the animated icon (e.g., a butterfly), its configuration parameters (e.g., colour, flight pattern, etc.) as well as associated AV media source address and synchronization information.

The graphics/text manager sub-module 1245 then calculates the arrival path for the icon object to be displayed. The graphics/text manager sub-module 1245 undertakes this task after it receives the graphics/text information signal 1290 by storing the extracted icon object in the dynamic icon database 1247. The graphics/text manager sub module 1245 then updates the dynamic icon database 1247 by configuring (e.g., assigns color=blue) the extracted icon object (e.g., the butterfly) while considering the event specification signal 1211 (e.g., a drama will begin in 15 minutes) and the user icon database 1244 (blue butterfly represents dramas). Furthermore, the graphics/text manager sub module 1245 utilizes the dynamic icon database 1247 to calculate the animation pattern (e.g., number of turns, length of each leg of flight, etc.) for the icon object (e.g., a blue butterfly) so that its animation may satisfy the arrival time (e.g., 15 minutes) of the event (e.g., a drama) that has been specified in the event specification signal 1211. Preferably, dynamic icon database 1247 stores the configuration and status parameters of the icon objects. The configuration parameters define the characteristics and behaviours of an object and are initialised by the graphics/text manager sub-module 1245 when an entry is created in the database 1247. The status parameters define the current status of an icon object and are updated periodically by the graphics/text manager sub-module 1245. For example, a dynamic icon database 1247 which comprises entries for butterflies indicating arrival of TV programs may comprise configuration parameters such as: icon instance id, id of the program this icon instance represents, type of animated action during recording (flapping wings), flight path (number of turns, lengths of various legs of the flight, total flight duration). Also, it may comprise status parameters such as: current x-y coordinates, size, recording status (not recording, recording or recorded). Also, if the user activates the animated icon object for preview, then the graphics/text manager sub-module 1245 updates the parameters of the icon object in the dynamic icon database 1247 so that a pop-up preview window may be generated.

The graphics/text manager 1245 is also responsible for a number of tasks concerning the recording of television programs. When the recording module 1220 starts recording a program, it sends a recording program event signal 1217 to the graphics/text manager sub module 1245, notifying it of the program being recorded. The graphics/text manager sub module 1245 then updates the corresponding icon object in the dynamic icon database 1247. This is done firstly to associate recorded program icon object to the recording icon object (eg. butterfly landing on a tree trunk). Secondly, to start animating the user-configured action that indicates the program is being recorded (eg. flapping the wings of the butterfly while remaining stationary). When the recording is finished, the recording module 1220 sends another recording program event signal 1217 to the graphics/text manager sub module 1245, notifying it of the recorded program. The graphics/text manager sub-module 1245 updates the corresponding icon object in the dynamic icon database 1247 to cease the animated action. The graphics/text manager sub module 1245 also generates a recorded program command signal 1215 on arrival of a user coordinate signal 1213 comprising a request for the details, preview or full-playback of a recorded program. This signal is sent to the recording module 1220 for processing. For example, the display coordinates in the user coordinates signal 1213 is translated by the graphics/text manager sub module 1245 to determine which icon object, and hence the corresponding recorded program, is selected. The graphics/text manager sub module 1245 then requests the recording module 1220 to extract the details or process the preview or full-playback of the selected program by sending it a recorded program command signal 1215 comprising an identifier of the recorded program.

The graphics/text manager sub-module 1245 is also adapted to manage the hardware/software resources to ensure appropriate processing to satisfy the received event specification signal 1211. For example, if a butterfly needs to have a 12 minute flight on the TV display between system clock time intervals 10:20-10:32, then appropriate local hardware/software resources need to be reserved for generating the graphical text stream 1249 within the specified time interval. The graphics/text manager sub module 1245 performs this management/resolution of available computation resources by first analyzing the characteristics of the extracted animated icon as specified in the graphics information signal 1290. The graphics/text information signal 1290 is generated by the graphics/text processing sub-module 1248 and inputted to the graphics/text manger sub-module 1245. The processing instruction for the extracted animated icon object is then issued by means of the graphics/text processing specification signal 1243 after some resource resolution scheme has been considered by the graphics/text manager sub module 1245.

The graphics/text manager sub-module 1245 also has the task of generating an output specification signal 1266 in response to the graphics/text information signal 1290 and the event specification signal 1211. The output specification signal 1266 comprises information for integrating and synchronizing the continuous graphics/text stream 1249 with the streaming audio-visual signal 1235. For example, the graphics/text manager sub module 1245 looks into the graphics/text information signal 1290 and analyzes the required integration and the synchronization specification for the GUI and associated audio-visual media. This analysis is then utilised to generate the output specification signal 1266.

The graphics/text manager 1245 also has the task of generating a graphics/text processing signal 1243 and instructing the graphics/text processing sub module 1248 to process icon objects. This signal 1243 specifies the icon objects to be processed by the graphics/text processing sub module 1248 for displaying. For example, the icon object instances that need to be processed by the graphics/text processing sub module 1248 can be specified by their instance ids in the dynamic icon database 1247.

During the setup mode, the graphics/text processing sub-module 1248 generates the configuration GUI in an conventional manner and will not be further discussed. During the standby mode, the graphics/text processing sub-module 1248 is adapted to perform the following tasks.

The graphics/text processing sub-module 1248 is responsible for the generation of the television program GUI, which is forwarded to the output module 1260 as the continuous graphics/text stream 1249. This continuous graphics/text stream 1249 is generated by the graphics/text processing sub-module 1248 which uses the animated icons and a background image as a resource so as to obtain the television program GUI. The graphics/text processing sub-module 1248 processes the icon objects according to instructions comprised in the graphics/text processing specification signal 1243. The graphics/text processing sub-module 1248, in response to a pre-designated instruction 1243 dynamically updates the dynamic icon database 1247 with the current status of the icon objects that are currently being displayed on the television apparatus 1201. As mentioned previously, the dynamic icon database 1247 stores configuration parameters of icon objects that are being displayed dynamically. For example, the status of dynamic icon objects (e.g., flying butterflies) on the TV display monitor 1272 may be their dynamic {x,y}-coordinate, size, orientation etc. The graphics/text processing module 1248 retrieves and updates the parameters of the icon object stored in the dynamic icon database 1247 at predetermined periods of time so as to step the icon objects through their animation. The configuration of these icon objects and background image at these predetermined times are formed into the continuous graphics/text stream 1249 for outputting to the output module 1260. Preferably, the continuous graphics/text stream 1249 may comprise sets of time sequenced graphics images of icon objects (e.g., butterflies, flowers, etc.) for generating their animated versions (e.g., butterflies flying, flowers blooming, etc.). Furthermore, the configured icon objects in the dynamic icon database 1247 are preferably in a compressed form and are decoded/uncompressed and then generated as a continuous graphics/text stream 1249 while satisfying certain timing constraints.

The graphics/text processing sub-module 1248 has also the task of initially obtaining the icon objects from the graphic/text icon source 1250, in the manner previously described.

The set top box 1203 also comprises an output module 1260. This output module 1260 is responsible for synthesizing incoming streaming graphics/text 1249 and an audio-visual signal 1235 (if required), thus producing a video signal for the television apparatus. The output module 1260 comprises an output mixer sub-module 1262 and an output manager sub-module 1264. The output module 1260 may be of a conventional output module for mixing streaming video signals.

The output manager sub module 1264 controls the output mixer sub module 1262. The output manager sub module 1264 is adapted to integrate and synchronize the streaming graphics/text 1249 and audio-visual content 1235 (if necessary) according to the output specification signal 1266. This module 1264 specifies to the output mixer sub module 1262 the audio-visual and graphics/text contents for generating each frame of the video signal 1276,1278 (e.g., mpeg-2, motion jpeg, etc.). The output specification signal comprises information for integrating and synchronizing the streaming graphics/text contents 1249 and streaming audio-visual contents 1235. For example, the synchronizing information can specify what portion of the graphics animation should be accompanied by the audio-visual clip, e.g., the preview of a recorded program is to be displayed in a small window associated with an icon object.

The output mixer sub-module 1262 combines graphics/text and audio-visual contents according to the instructions of the mixer specification signal 1267. The mixer specification signal 1267 comprises information for synchronizing streaming graphics/text 1249 with streaming audio-visual contents 1235. For example, combines graphics/text (eg. butterflies in a forest) and audio-visual (recorded program preview) contents to generate frames of mpeg-2 stream. The output mixer module 1260 is also directly coupled to the AV source 1226 for receiving an audio-visual signal of a TV program currently being broadcast. For ease of illustration, the AV source is shown both in FIGS. 12A and 12B.

In a further variation of the preferred television system, the user interface manager module 1204, the graphics/text module 1240, the audio-visual recording manager sub-module 1225, and the audio-visual recording sub-module 1222 can be embedded as software in a digital television 1201 and/or set top box 1203.

Turning now to FIGS. 14 to 19, there is now described an overview of the method of operation of the television system 1200 described with reference to FIGS. 12A and 12B.

Figure 14:
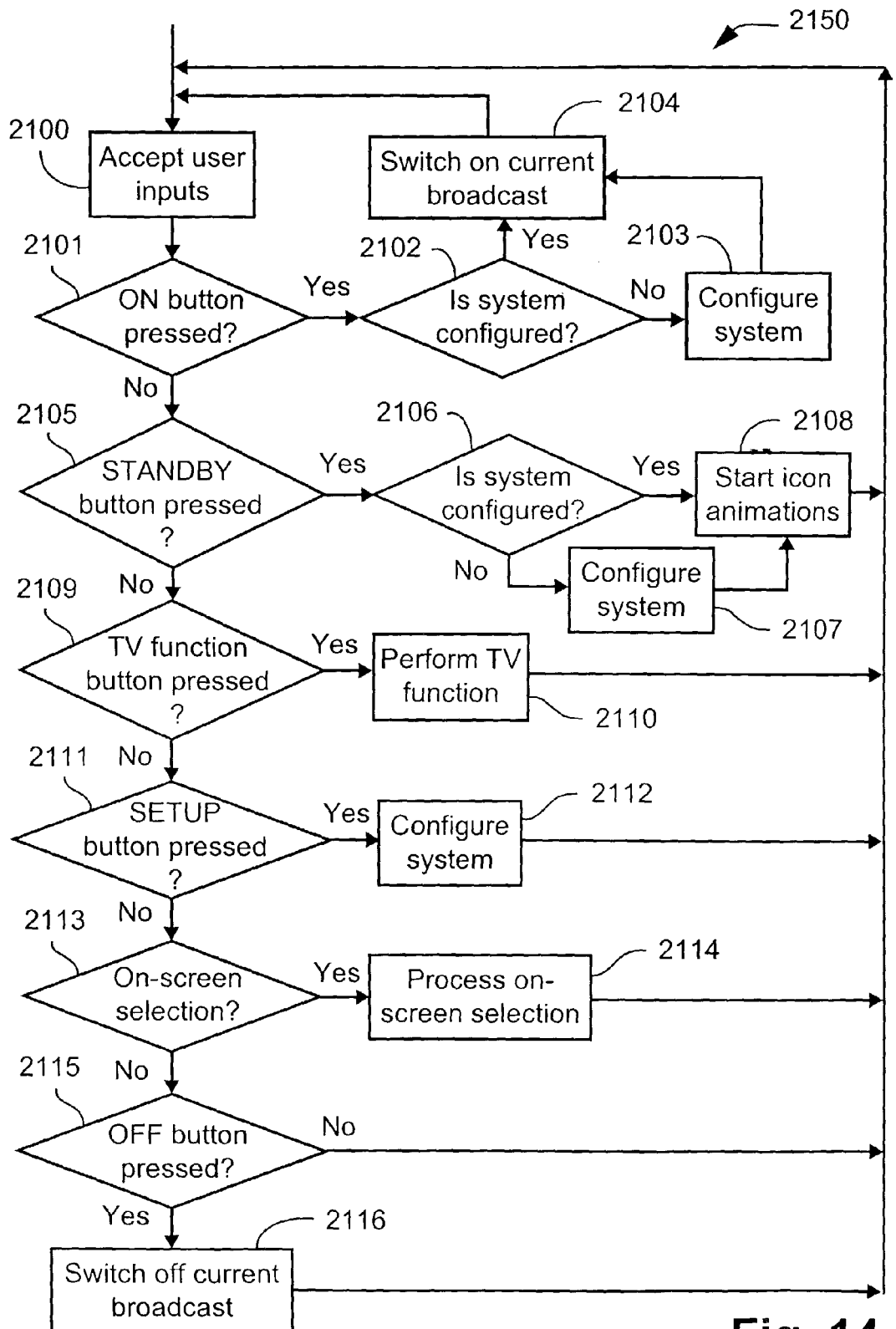
FIG. 14 shows a flow chart of the user interaction between the remote control device 1202 and the television system 1200.

Firstly, turning to FIG. 14 there is shown a flow chart of the user interaction between the remote control device 1202, such as for example the device 1300 (FIG. 13) and the television system 1200 (FIGS. 12A and 12B). The television system 1200, when in a powered on state is continually awaiting user input from the remote control device 1202. The user input can include button presses and on-screen icon and menu selections. After the television system 1200 receives user input at step 2100 it proceeds to a series of comparison steps 2101, 2105, 2109, 2111, 2113, 2115, 2116 to determine what operation selected by the user is to be performed.

The television system 1200 checks at step 2101, whether the user has pressed the ON button of the remote control device 1202. In the event the user has pressed the ON button, the comparison check 2101 returns yes and the television system proceeds to a comparison step 2102. The television system 1200 checks in comparison step 2102 whether the configuration of the television GUI has been carried out previously. An example of a television GUI is described previously with reference to FIGS. 5 to 11. If the television GUI has been configured previously, the television system proceeds to step 2104 where the system switches on a current broadcast on the television monitor. Otherwise, the television system proceeds to step 2103, where the system displays on the monitor a configuration GUI for configuring the television GUI. This step 2103 is described in more detail below with reference to FIG. 15. After the television GUI has been configured, the system proceeds to step 2104, where the system switches on a current television broadcast on the monitor. After step 2104, the system returns to step 2100 to await further user input. On the other hand, in the event the user has not pressed the ON button, the comparison check 2101 returns no and the television system proceeds to the comparison step 2105.

The television system 1200 checks at comparison step 2105, whether the user has pressed the STANDBY button of the remote control device 1202. In the event the user has pressed the STANDBY button, the comparison check 2105 returns yes and the television system proceeds to a comparison step 2106. The television system 1200 checks in comparison step 2106 whether the configuration of the television GUI has been carried out previously. If the television GUI has NOT been configured previously, the television system proceeds to step 2107, where the configuration GUI is displayed for configuring the television GUI. This step 2107 is the same as step 2103 and is described in more detail below with reference to FIG. 15. After the completion of the configuration of the television GUI in step 2107, the system proceeds to step 2108. On the other hand, if the comparison step 2106 determines the television GUI has been configured previously, the television system proceeds to step 2108. During step 2108, the television system 1200 displays the television GUI and starts the animation of the icons relating to the time schedules of selected programs and the status of the recording of selected programs, if any. This step 2108 is described in more detail with reference to FIGS. 15 and 17. After step 2108, the system returns to step 2100 to await further user input. On the other hand, in the event the user has not pressed the STANDBY button, the comparison check 2105 returns no and the television system proceeds to the comparison step 2109.

The television system 1200 checks at comparison step 2109, whether the user has pressed one of the TV function buttons of the remote control device 1202. In the event the user has pressed one of these buttons, the television systems proceeds to step 2110, where it performs the operation corresponding to the button (eg. change channel). After step 2110, the system returns to step 2100 to await further user input. On the other hand, in the event the user has not pressed any one of the TV function buttons, the comparison check 2109 returns no and the television system proceeds to the comparison step 2111.

The television system 1200 checks at step 2111, whether the user has pressed the SETUP button of the remote control device 1202. In the event the user has pressed the SETUP button, the television systems proceeds to step 2112, where it displays the configuration GUI for configuring the television GUI. This step 2112 is the same as steps 2103, and 2107 and is described in more detail below with reference to FIG. 15. After step 2112, the system returns to step 2100 to await further user input. On the other hand, in the event the user has not pressed the SETUP button, the comparison check 2111 returns no and the television system proceeds to the comparison step 2113.

The television system 1200 checks at step 2113, whether the user pressed an on-screen selection such as an icon or menu selection using the touch panel of the remote control device 1202 of the remote control device 1202. If so, the system translates the x-y coordinates to a selection and then processes the selection accordingly in Step 2114, which step is described in more detail with reference to FIG. 16. After step 2114, the system returns to step 2100 to await further user input. On the other hand, in the event the user has not pressed an on-screen selection, the comparison check 2113 returns no and the television system proceeds to the comparison step 2115.

The television system 1200 checks at step 2115, whether the user has pressed the OFF button of the remote control device 1202. In the event the user has pressed the OFF button, the television system proceeds to step 2116, where the television monitor is turned off, and the television system returns to 2100 to await further user input. Otherwise, if the user has not pressed the OFF button, the system proceeds directly to step 2100 to await further user input.

Figure 15:
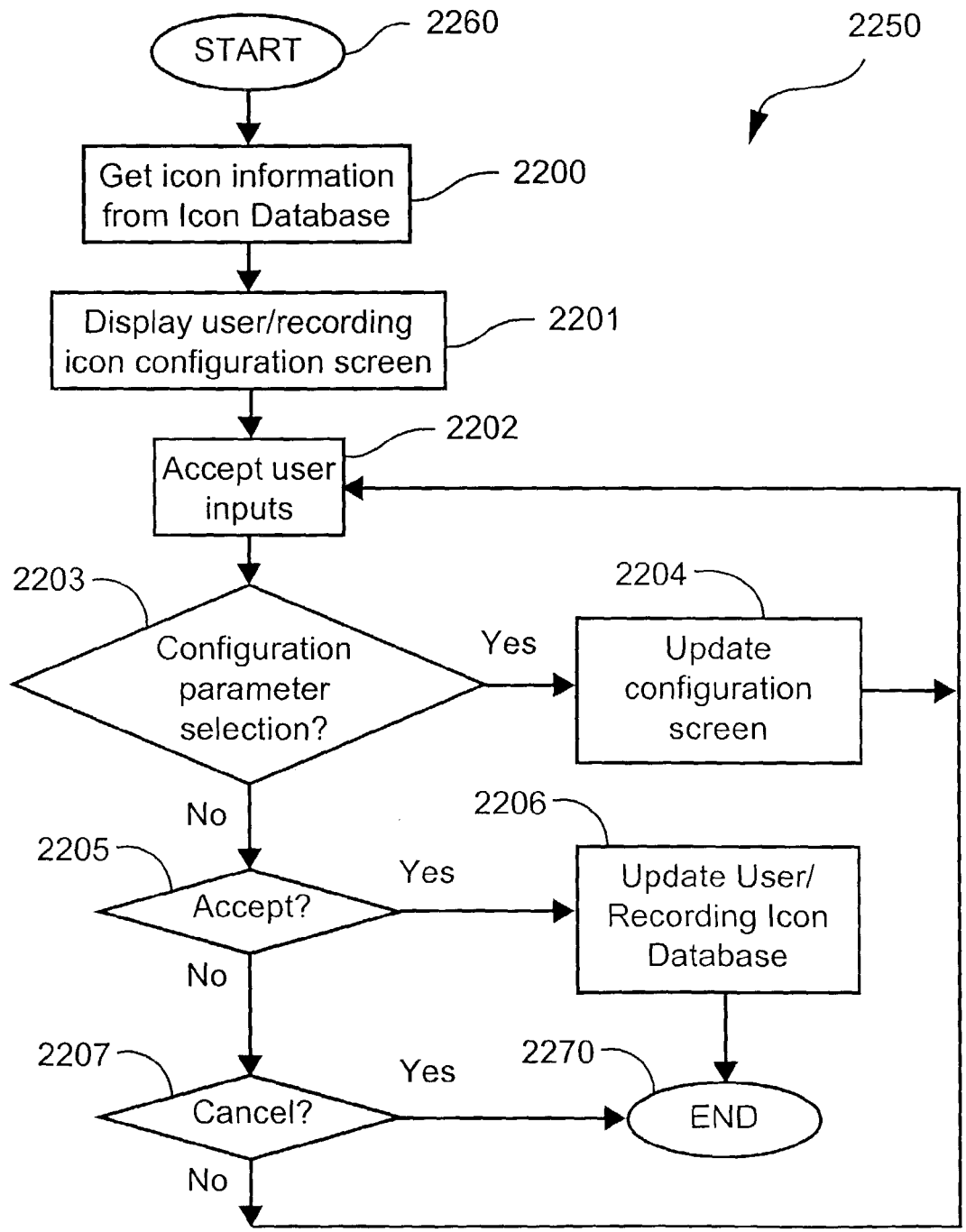
FIG. 15 shows a flow chart of a process for configuring the parameters of user and recording icons of the television GUI used in the television system 1200.

Turning now to FIG. 15, there is shown a flow chart of a process 2250 for configuring the parameters of user and recorded program icons of the television GUI. The steps 2103, 2107, 2112 each implement this process 2250 as required. User icons are icons that represent the arrival of TV programs of user-designated categories, eg. blue butterfly for drama (see for example FIG. 4). Recorded program icons are user-selectable icons that associate with user icons to indicate corresponding TV programs have been recorded. The configuration process commences at step 2260 and proceeds to step 2200, where the system gets the required menu information for the display of the configuration GUI from the Icon Database and the Graphic/Text Icon Source. The available icons are then displayed in step 2201 in the configuration GUI for the user to start configuring the system. The television system 1200 accepts user input in the next step 2202 via the configuration GUI interface and the remote control device 1202. The user may make an on-screen selection such as an icon or menu selection using the touch panel of the remote control device 1202. After step 2202 has received the user input, the configuration process 2250 proceeds to a comparison step 2203. The comparison step 2203 checks whether a configuration parameter has been selected. Configuration parameters include the following amongst others: the type of icon, colour, program category, animated actions for indicating recording status, etc. In the event a configuration parameter has been selected, the comparison step 2203 returns yes and the process 2250 proceeds to step 2204, where the configuration GUI display is updated accordingly. Otherwise, if a configuration parameter has not been selected the comparison step 2203 returns no and the process 2250 proceeds to a comparison step 2205, where a check is made whether the user has selected an ACCEPT button on the configuration GUI. In the event the user input is ACCEPT, then the process 2250 proceeds to step 2206, where the selected configuration parameters are saved in the User Icon Database and/or the Recording Icon Database. Otherwise, the process 2250 proceeds to a comparison step 2207, where a check is made whether the user has selected a CANCEL button on the configuration GUI. In the event the user input is CANCEL, then the process 2250 proceeds to step 2270, where the configuration process 2250 is terminated and the system proceeds 2104, 2108, or 2100 as required. Otherwise, the process 2250 returns to step 2202, to await further user input.

Figure 16:
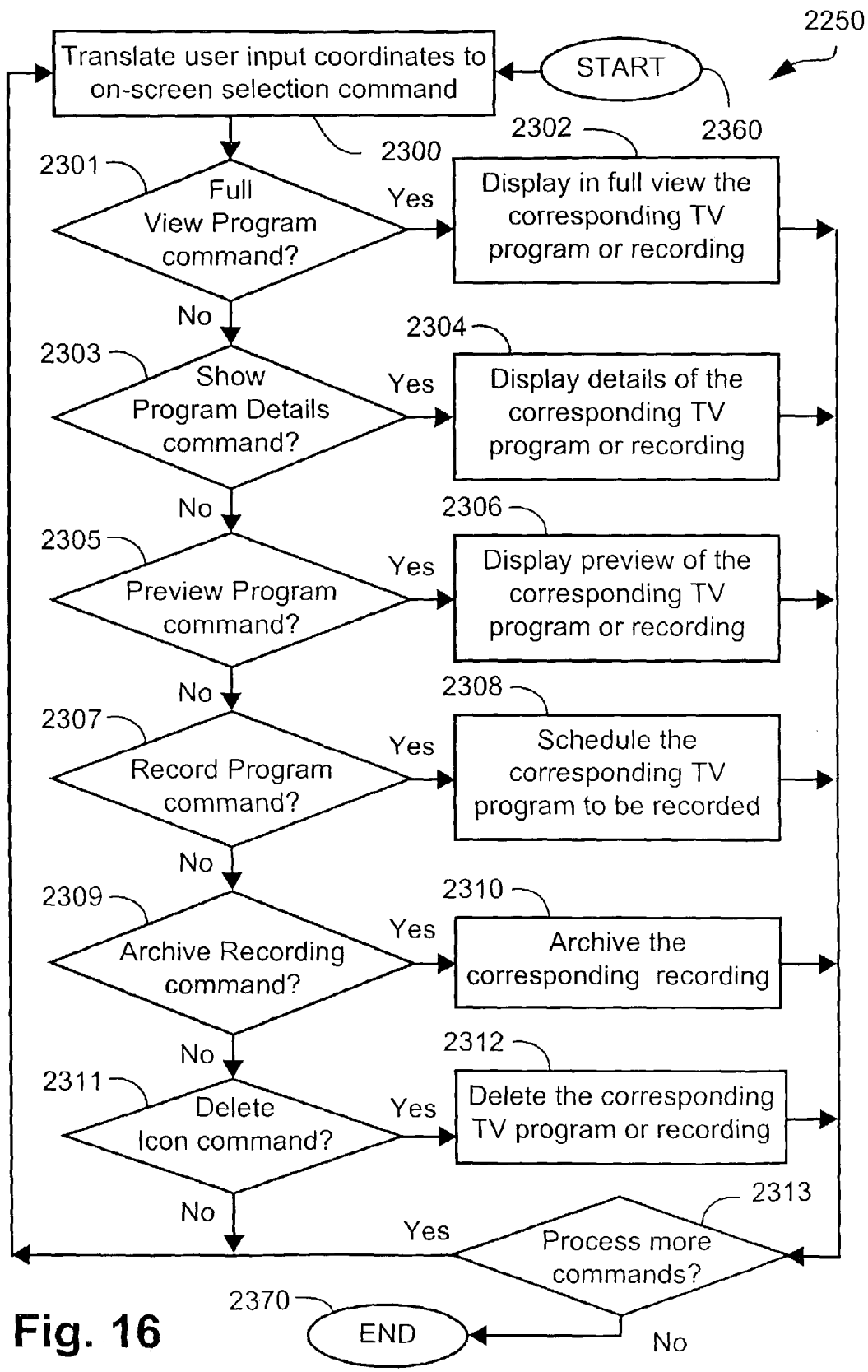
FIG. 16 shows a flow chart of a step for processing on-screen selections used in the television system 1200.

Turning now to FIG. 16, there is shown a flow chart of a step 2114 for processing on-screen selections. The step 2114 commences at step 2360 and then proceeds to step 2300, wherein the current user input x-y co-ordinates are translated into a selection command currently corresponding to these x-y co-ordinates. During step 2300, if the current user input x-y co-ordinates do not correspond to currently displayed selection commands, the step 2300 terminates and returns to step 2110 (not shown). Otherwise, the step 2300 proceeds to a series of comparison steps 2301, 2303, 2305, 2307, 2309, 2311 in order.

In the event the comparison step 2301 determines the command is a Full View Program command, the comparison step 2301 returns yes and proceeds to step 2302. The system in step 2302 displays the program or recording represented by the selected icon in full view. After completion of step 2302, the system proceeds to comparison step 2313. On the other hand, if the comparison step 2301 determines the command is not a Full view command, the comparison step 2301 returns no and the system proceeds to comparison step 2303.

In the event the comparison step 2303 determines the command is a Show Program Details command, the comparison step 2303 returns yes and proceeds to step 2304. The system in step 2304 displays the details of the program or recording represented by the selected icon in a pop-up window. This involves retrieving the details from the AV source for a program and from the Recorded Program Register for a recording. After completion of step 2304, the system proceeds to comparison step 2313. On the other hand, if the comparison step 2303 determines the command is not a Show Program Details command, the comparison step 2303 returns no and the system proceeds to comparison step 2305.

In the event the comparison step 2305 determines the command is a Preview Program command, the comparison step 2305 returns yes and proceeds to step 2306. The system in step 2306 plays a preview the program or recording represented by the selected icon in a pop-up window. This involves retrieving a preview from the AV Source for a program or from AV Storage for a recording. After completion of step 2306, the system proceeds to comparison step 2313. On the other hand, if the comparison step 2305 determines the command is not a Preview Program command, the comparison step 2305 returns no and proceeds to step 2307.

In the event the comparison step 2307 determines the command is a Record Program command, the comparison step 2307 returns yes and proceeds to step 2308. The system in step 2308 schedules the program represented by the selected icon to be recorded. This involves adding an entry to the Recording Schedules. After completion of step 2308, the system proceeds to comparison step 2313. On the other hand, if the comparison step 2307 determines the command is not a Record Program command, the comparison step 2307 returns no and proceeds to step 2309.

In the event the comparison step 2309 determines the command is an Archive Recording command, the comparison step 2309 returns yes and proceeds to step 2310. The system in step 2310 archives the recording represented by the selected icon in Step 2310. This involves marking the corresponding entry in the Recorded Program Register as archived. After completion of step 2310, the system proceeds to comparison step 2313. On the other hand, if the comparison step 2309 determines the command is not a Archive command, the comparison step 2309 returns no and proceeds to step 2311.

In the event the comparison step 2311 determines the command is Delete Icon command, the comparison step 2311 returns yes and proceeds to step 2312. The system in step 2312 deletes the selected icon by removing the corresponding entry in the Dynamic Icon Database. If the icon represents a recording, the corresponding is also deleted. After completion of step 2312, the system proceeds to comparison step 2313. On the other hand, if the comparison step 2311 determines the command is not a Delete Icon command, the comparison step 2311 returns no and proceeds directly to 2313.

In the event the comparison step 2313 determines there are no more commands to process, step 2114 finishes 2370 and returns to await further user input 2100. Otherwise, the step 2114 returns to step 2300 to process any further commands.

Figure 17:
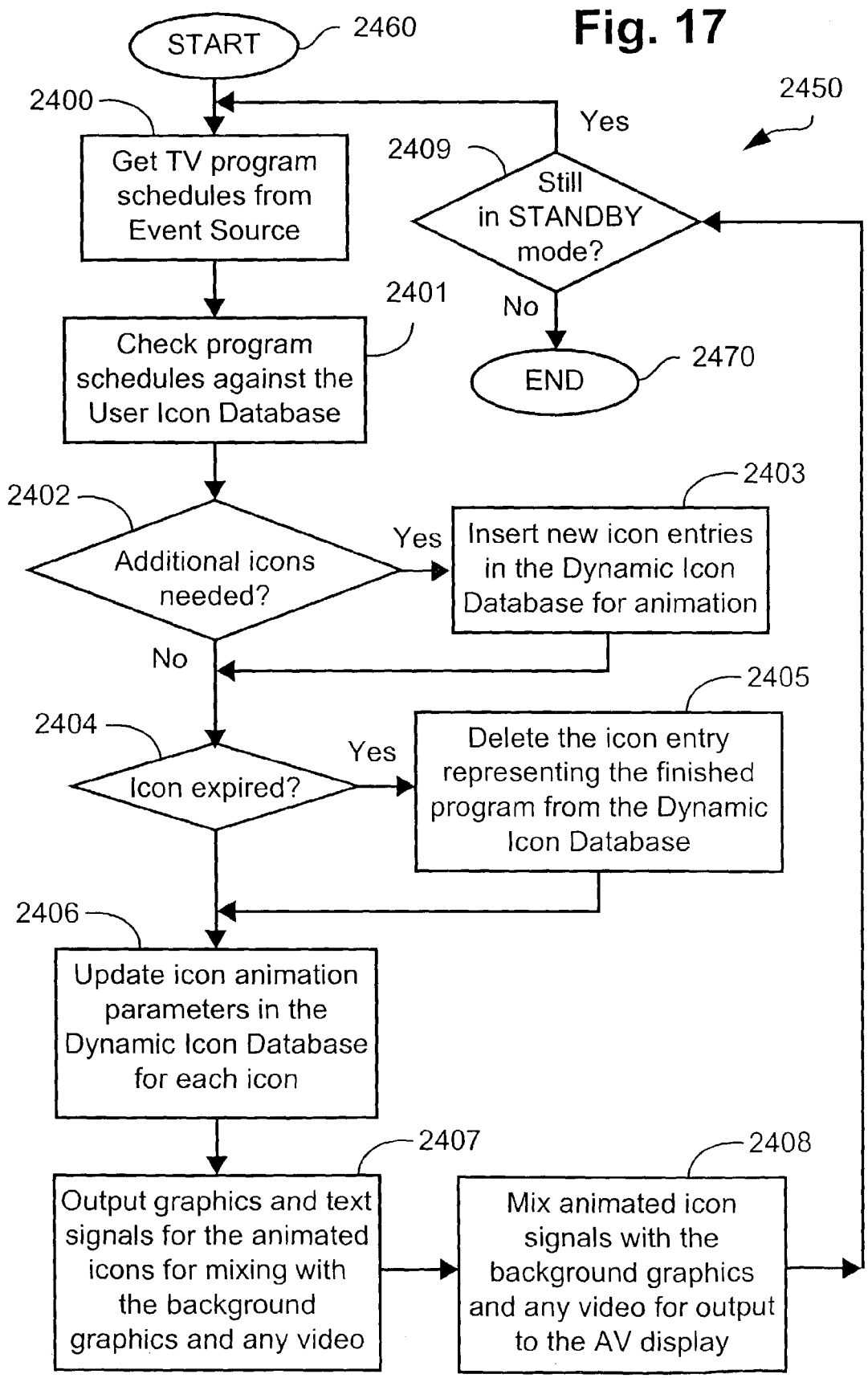
FIG. 17 shows a flow chart of a process for displaying the television GUI and the animation of the icons used in the television system 1200.

Turning now to FIG. 17 there is shown a flow chart of a process 2450 for displaying the television GUI and the animation of the icons. The system 1200 implements this process 2450 during step 2108. The process 2450 commences at step 2460, and proceeds to step 2400 where the system gets the current TV program schedules and those for the immediate future. These schedules are then checked against the icon entries in the User Icon Database in step 2401 and compared in comparison step 2402 to determine whether additional icon entries are needed to be added to the Dynamic Icon Database for animating new icons for representing programs of designated categories. If so, new entries are added to the Dynamic Icon Database in step 2403, after which the process 2450 proceeds to comparison step 2404. On the other hand, if there are no additional icons required to be added to the Dynamic Icon Database, the process 2450 proceeds directly to comparison step 2404.

Comparison step 2404 checks whether any programs represented by existing icons are finished. If so, the corresponding entries in the Dynamic Icon Database are removed in step 2405. Otherwise, the process 2450 proceeds directly to step 2406. At this stage, the parameters of all the entries in the Dynamic Icon Database are ready to be updated to show the next position and action of the animation. This is performed in step 2406 and involves calculating the next set of parameter values from the current set of values. The manner which this step 2406 is implemented is explained in more detail with reference to FIG. 19. After the next set of parameter values for each icon are calculated and updated in the Dynamic Icon Database by step 2406, the system proceeds to step 2407. Step 2407 generates an output graphics and text signal according to the parameter values of the icons calculated during the previous step 2406. The signal is then mixed during step 2408 with the background signal (eg. forest screen) together with any video signal, eg. from preview, to be output to the AV Display 1201.

The process 2450 then proceeds to a comparison step 2409 for checking whether the current state is still in the STANDBY mode. If so, the process 2450 returns to 2400 for repeating the process, otherwise the step 2108 finishes and returns to step 2100. The process is repeated periodically at short intervals.

Figure 18:
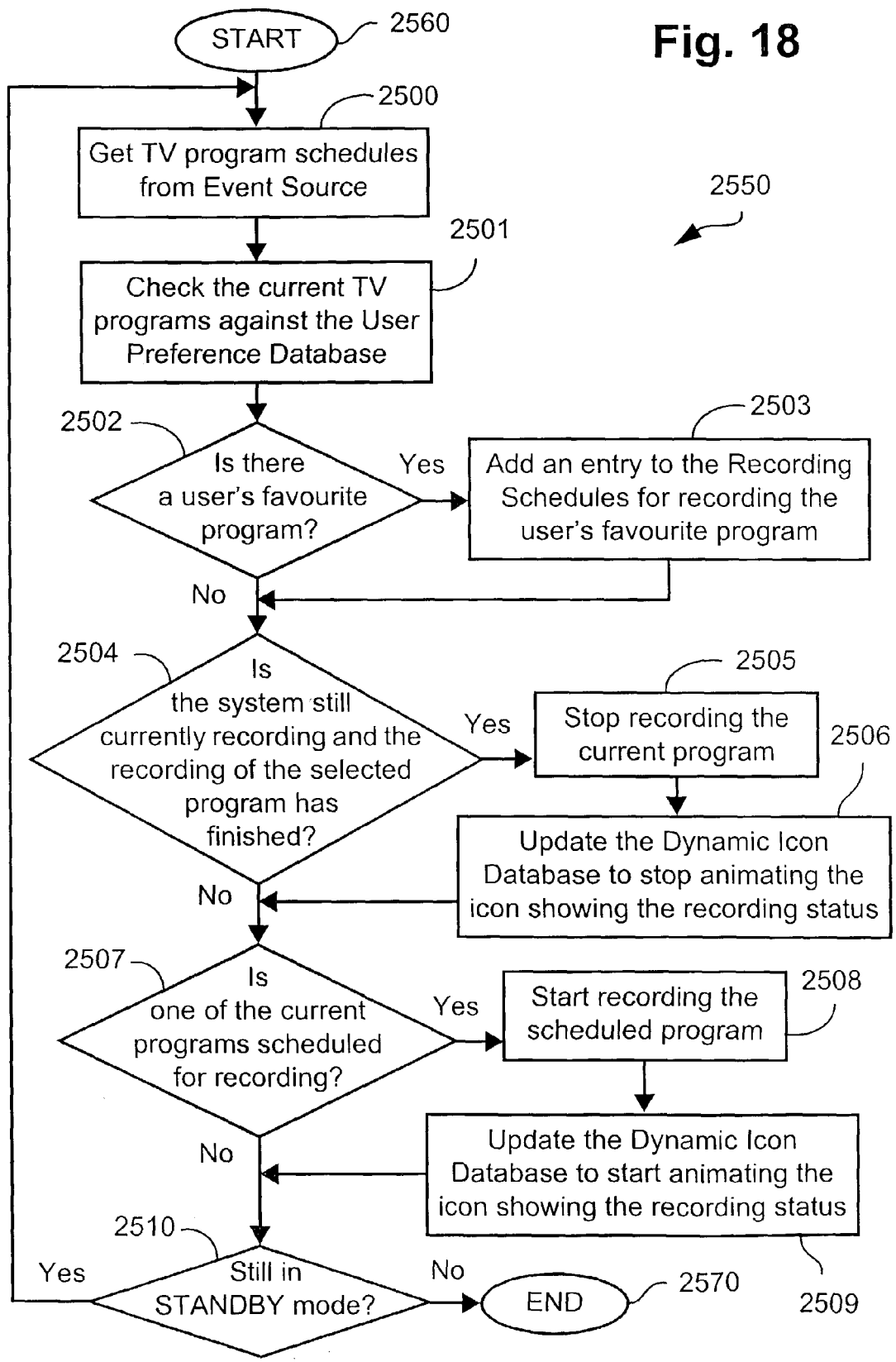
FIG. 18 shows a flow chart of a process for the automatic recording of selected television programs and the display of the status of the recording of these selected programs used in the television system 1200.

Turning now to FIG. 18, there is shown a flow chart of a process 2550 for the automatic recording of selected television programs and the display of the status of the recording of these selected programs. The system implements this process 2550 during step 2108 and is run at the same time as the process 2450 (FIG. 17). However, the process 2450 for animating icons is preferably updated every few seconds, whereas the process 2550 for the automatic recording is updated at longer periods, for example one minute or so. This process 2550 commences at step 2560 and proceeds to step 2500 where the system gets the current TV program schedules. These schedules are used to check against the User Icon Database in step 2501 and compared in a comparison step 2502 to determine whether any of the current programs is a user's preference. If so, the program is scheduled for recording in step 2503. This step 2503 involves inserting an entry in the Recording Schedules. After completion of this step 2503, the process 2550 proceeds to a comparison step 2504. On the other hand, if none of the current programs are a user's preference, the process 2550 proceeds directly to the comparison step 2504.

The comparison step 2504 checks whether the system is currently still recording and the selected program it was recording has indeed finished. If so, the comparison step 2504 returns yes and the process 2550 proceeds to step 2505, where the recording of the selected program it was recording is stopped. The process 2550 then in the next step 2506 updates the corresponding entry in the Dynamic Icon Database is updated to stop the animated action associated with the recording. After the completion of step 2506, the process 2550 proceeds to comparison step 2507. On the other hand, if the comparison step 2504 returns no, the process 2550 proceeds directly to step comparison step 2507.

The comparison step 2507 checks whether any one of the television programs currently being broadcast matches an entry in the Recording Schedules. If so, comparison step 2507 returns yes and the system starts recording (if possible) the program corresponding to the matched entry in step 2508 and updates the Dynamic Icon Database in Step 2509 to start the animation of the icon showing the recording status. Sometimes, the system may have multiple programs scheduled for recording at the same time, and the system will preferably record the program of a highest priority. After completion of step 2509 the process 2550 proceeds to comparison step 2510. On the other hand, if there are no entries matching the television programs currently being broadcast, then the process 2550 proceeds directly to comparison step 2510.

The comparison step 2510 checks whether the current state of the television system is still in the STANDBY mode. If so, the process 2550 returns to 2500 for repeating the process, otherwise the process 2550 finishes and returns to step 2100. The processing 2550 is repeated periodically to monitor the need to start and stop recording user's programs of preference.

Figure 19:
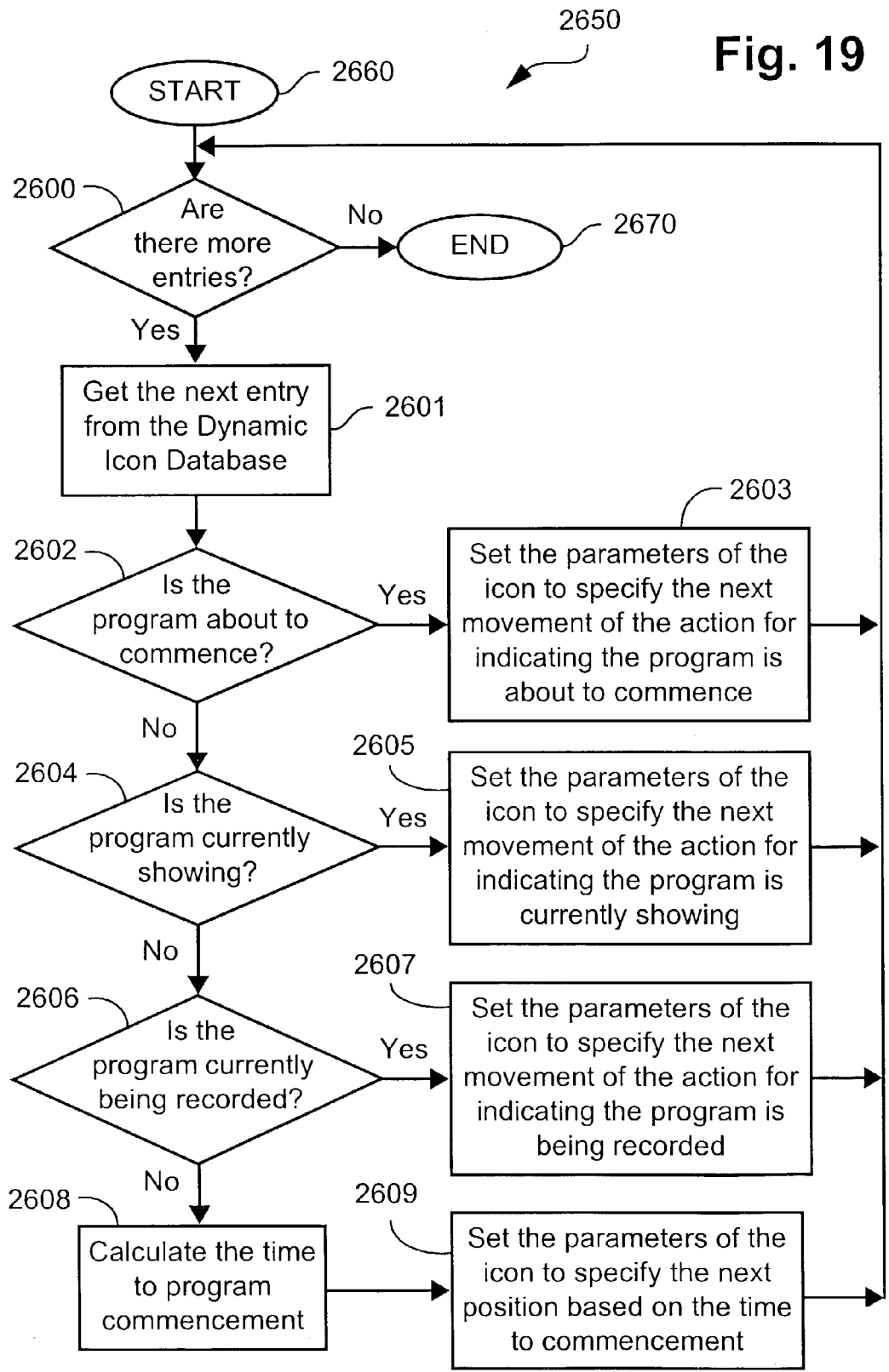
FIG. 19 shows a flow chart of a process for calculating and updating the parameters for each icon.

Turning now to FIG. 19, there is a shown a flow chart of a process for calculating and updating the parameters for each icon entry in the Dynamic Icon Database. This process 2650 is implemented by the system 1200 during step 2406. The process 2650 commences at step 2660 and proceeds to a comparison step 2600, where the comparison step 2600 checks if there are any entries in the Dynamic Icon Database to be updated. If there are no entries to be updated the process 2650 finishes 2670 and the system proceeds to step 2407.

On the other hand, if there are entries to be updated, the process 2650 proceeds to step 2601, where the next entry to be updated is retrieved for processing. After completion of step 2601, the process 2650 proceeds to a comparison step 2602.

The comparison step 2602 determines whether the program represented by the currently retrieved icon entry is about to commence in less than the predefined time period (eg. five minutes). If the comparison step 2602 returns yes, the process 2650 proceeds to step 2603 where the appropriate parameters of the retrieved icon entry are set to specify the next movement of the action for indicating that the program is about to commence. For example, the parameters are set so that the butterfly hovers at the bottom of the screen. Otherwise, if the comparison step returns no, then the process 2650 proceeds to comparison step 2604.

The comparison step 2604 determines whether the program represented by the currently retrieved icon entry is currently being broadcast. If the comparison step 2604 returns yes, the process 2650 proceeds to step 2605 where the appropriate parameters of the icon entry are set in 2605 to specify the next movement of the action for indicating that the program is currently being broadcast. For example, the parameters are set so that the butterfly remains stationary at the bottom of the screen. Otherwise, if the comparison step 2604 returns no, then the process 2650 proceeds to comparison step 2606.

The comparison step 2606 determines whether the program represented by the icon entry is being recorded. If the comparison step 2606 returns yes, the process 2650 proceeds to step 2607 where the appropriate parameters of the icon entry are set to specify the next movement of the action for indicating that the program is being recorded. For example, the parameters are set so that the butterfly sits on a tree trunk with its wings flapping. Otherwise, if the comparison step 2606 returns no, then the process 2650 proceeds to step 2608.

If the process 2650, reaches step 2608 this indicates that the program is still a while from commencement. The process 2650 in step 2608 calculates the time remaining to the commencement of the program. The process 2650 then proceeds to step 2609, where the calculated time remaining is used to determine the position of the icon (for a butterfly) on the screen such that the icon will traverse the background scene of the screen from a distant position to the foreground along a path based on the time remaining. That is, the smaller the time remaining, the closer the icon is to the foreground. Preferably, this time remaining is compared against a threshold, and if it is greater than this threshold the icon is not displayed in the screen.

After completion of any one of the steps 2603, 2605, 2607, 2609, the process 2650 returns to the comparison step 2600, where it checks whether there any more entries for processing. If there are, the process 2650 processes the next entry in similar fashion, otherwise if there are no more entries the process 2650 finishes 2670 and proceeds to step 2407.

It will be appreciated the aforementioned method of operation of the television system 1200 is an overview, and further details on the operation may be had with reference to the detailed description of the television system 1200.

INDUSTRIAL APPLICABILITY

It is apparent from the above that the embodiment(s) of the invention are applicable to multimedia display systems, in particular television systems.

The foregoing describes some embodiments of the present invention, and modifications and/or changes can be made thereto without departing from the scope and spirit of the invention, the embodiment(s) being illustrative and not restrictive.

The invention claimed is:

1. A method of attracting a user's attention to the arrival of a television program selected by a user, in a television system receiving a television broadcast and displaying a television program on a television monitor, using information related to a broadcast start time of the selected television program, by displaying a nature scene image on the television monitor until the broadcasting of the selected television program starts, the method comprising:

an assigning step of assigning a specific animated icon to the selected television program, the animated icon being an image of a creature;

a displaying step of displaying the specific animated icon over the nature scene image on the television monitor;

a first altering step of altering a display position of the specific animated icon towards a first pre-designated location in the nature scene image, said first pre-designated location being associated with the broadcasting of the selected television program, wherein a distance between the current display position of the specific animated icon and the first pre-designated location depends on a time left till a start of the broadcasting of the selected television program, and the specific animated icon moves, increasing in size, from a position corresponding to the back-portion of the nature scene to a position corresponding to the fore-portion of the nature scene in the nature scene image as time progresses;

a first displaying step of displaying a preview of the selected television program, upon displaying the specific animated icon at the first pre-designated location for a predetermined period of time;

a second altering step of altering the display position of the specific animated icon towards a second pre-designated location in the nature scene image, said second pre-designated location being associated with a recording of the selected television program; and a second displaying step of displaying the specific animated icon performing a pre-designated action at the second pre-designated location in the nature scene image during the recording of the selected television program.

2. A method according to claim 1, wherein the television system includes a recording unit for recording the television program, and in said second displaying step, at least one of a size, a position, and a motion of the specific animated icon is altered depending on a recording status of the selected television program by the recording unit.

3. A method according to claim 1, wherein a color of the specific animated icon is related to a category of the selected television program.

4. A method according to claim 1, wherein a form of the specific animated icon is associated with one of a plurality of users.

5. A method according to claim 2, wherein the recording status includes the status during recording and after recording.

6. A television system for receiving a television broadcast and displaying a television program on a television monitor, and for attracting a user's attention to the arrival of a television program selected by a user using information related to a broadcast start time of the selected television program by displaying a nature scene image on the television monitor until the broadcasting of the selected television program starts, the system comprising:

said television monitor;

a memory for storing data and a computer program; and a processor coupled to said memory to execute the computer program, said processor functioning as:

an assigning unit which assigns a specific animated icon to the selected television program, the animated icon being an image of a creature;

a displaying unit which displays the specific animated icon over the nature scene image on the television monitor;

a first altering unit which alters a display position of the specific animated icon towards a first pre-designated location in the nature scene image, said first pre-designated location being associated with the broadcasting of the selected television program, wherein a distance between the current display position of the specific animated icon and the first pre-designated location depends on a time left till a start of the broadcasting of the selected television program, and the specific animated icon moves, increasing in size, from a position corresponding to the back-portion of the nature scene to a position corresponding to the fore-portion of the nature scene in the nature scene image as time progresses;

a first displaying unit which displays a preview of the selected television program, upon displaying the specific animated icon at the first pre-designated location for a predetermined period of time;

a second altering unit for altering a display position of the specific animated icon towards a second pre-designated location in the nature scene image, said second pre-designated location being associated with a recording of the selected television program; and a second displaying unit which displays the specific animated icon performing a pre-designated action at the second pre-designated location in the nature scene image during the recording of the selected television program.

* * * * *